United States Patent [19]

Yetter

[11] Patent Number: 5,392,423

[45] Date of Patent: Feb. 21, 1995

[54] UNIVERSAL PIPELINE LATCH FOR MOUSETRAP LOGIC CIRCUITS

[75] Inventor: Jeffry D. Yetter, Ft. Collins, Colo.

[73] Assignee: Hewlett-Packard Company, Palo Alto, Calif.

[21] Appl. No.: 259,270

[22] Filed: Jun. 13, 1994

Related U.S. Application Data

[63] Continuation of Ser. No. 684,637, Apr. 12, 1991, abandoned.

[51] Int. Cl.[6] ............................................. G06F 1/12
[52] U.S. Cl. ................................. 395/550; 395/800; 365/233; 371/61; 364/231.8; 364/270.3; 364/DIG. 1; 326/95
[58] Field of Search ............... 395/800, 775, 550, 500; 371/61, 62, 68.3; 365/230.03, 230.04, 230.08, 233; 307/260, 269, 272.1–272.3, 480–482.1

[56] References Cited

U.S. PATENT DOCUMENTS

| | | | |
|---|---|---|---|
| 4,072,869 | 2/1978 | Gillow | 307/291 |
| 4,806,786 | 2/1989 | Valentine | 307/279 |
| 4,949,249 | 8/1990 | Lefsky et al. | 395/550 |
| 4,970,406 | 11/1990 | Fitzpatrick et al. | 307/272.1 |
| 5,001,731 | 3/1991 | Atwell, Jr. et al. | 375/107 |
| 5,121,003 | 6/1992 | Williams | 307/462 |
| 5,124,572 | 6/1992 | Mason et al. | 307/269 |
| 5,164,619 | 11/1992 | Luebs | 307/480 |
| 5,206,861 | 4/1993 | Hannon et al. | 371/22.3 |
| 5,226,011 | 7/1993 | Yamagisawa | 365/189.05 |
| 5,233,617 | 8/1993 | Simmons et al. | 371/61 |
| 5,255,383 | 10/1993 | Lewis et al. | 395/425 |

Primary Examiner—Alyssa H. Bowler
Assistant Examiner—Alpesh M. Shah

[57] ABSTRACT

Vector logic is implemented by pipelining logic stages comprised of dynamic mousetrap logic gates. A novel pipeline latch is associated with each logic stage of the pipeline. Each pipeline latch has a latch reset mechanism, an input trigger mechanism, a disabling mechanism, a flip-flop mechanism, an output gating mechanism, and a latch enable pull-up mechanism. Moreover, the logic stages are alternately clocked. While the even numbered stages are receiving a high clock signal for instigating propagation, the odd numbered stages are receiving a low clock signal for instigating precharging, and vice versa. The high and low clock times for each stage is substantially equivalent. Due to inherent manufacturing inequalities, clock asymmetry results. An advantaged and disadvantaged phase arises. Because of the novel latch and associated method, pipeline stages operating in the disadvantaged phase can steal time from those operating in the advantaged phase. Further, no minimum clock frequency is required.

14 Claims, 12 Drawing Sheets

UNIVERSAL PIPELINE LATCH FOR MOUSETRAP LOGIC CIRCUITS

CROSS REFERENCE TO RELATED APPLICATION

This is a continuation of application Ser. No. 07/684,637, filed on Apr. 12, 1991, now abandoned.

BACKGROUND OF THE INVENTION

I. Field of the Invention

The present invention relates generally to logic in computers and, more particularly, to a system and method for configuring "mousetrap" logic gates in a pipeline.

II. Related Art

Pipelining in computer logic generally refers to the concept of configuring various stages of logic in sequence, whereby data is initially introduced into the sequence of logic stages and then subsequently more data is introduced before completion of the operation on the first data through the sequence. Pipelining enhances the performance of high "latency" logic networks. High latency logic networks are logic circuits which perform long sequences of logic operations requiring a relatively large amount of time. Pipelining improves performance because pipelining permits the overlapping of operation execution.

At present, pipelining is considered a requirement for high latency logic networks in the high performance arena. For instance, instruction execution logic in the central processing unit (CPU) of a computer invariably employ pipelining.

As a further example of where pipelining is considered a necessity, consider multiplication. To perform multiplication, a "carry save adder" pipeline of logic stages is usually employed. Specifically, each pipeline stage is essentially several rows of conventional full adder logic stages. Moreover, each full adder compresses three partial products into two partial products. Thus, each full adder adds in another partial product as data flows through the chain of full adder logic stages in each pipeline stage. In order to perform a single multiplication operation, more than one clock cycle is usually required, but as a result of pipelining, a new multiplication operation may be commenced generally in substantially less than, perhaps in half of, the total number of clock cycles.

Traditionally, "static" logic gates have been utilized in computers to perform logic functions, for example, mathematical operations. Static logic gates are those which can continuously perform logic operations so long as electrical power is available. In other words, static logic gates need no electrical precharge, or refresh, in order to properly perform logic operations. Static logic gates can be easily connected together in sequence to collectively perform logic functions in an efficient manner.

However, static logic gates are slow individually. In addition, when static logic gates are pipelined, the resulting logic operation is performed in an even slower manner.

"Dynamic" logic gates are also known in the art. Dynamic logic gates are used in the conventional design of logic circuits which require high performance and modest size. Dynamic logic gates are much faster than static logic gates. However, dynamic logic gates require a periodic electrical precharge, or refresh, such as with a dynamic random access memory (DRAM), in order to maintain and properly perform their intended logic function. Once an electrical precharge supplied to a dynamic logic gate has been discharged by the dynamic logic gate, the dynamic logic gate can no longer perform another logic function until subsequently precharged.

However, the use of conventional dynamic logic circuits in combinational logic or pipelining is problematic. First, dynamic logic circuits require a precharge cycle in order to render them operative. Effectively, a precharge cycle periodically interrupts the useful work cycle for the necessary purpose of maintenance. Precharge cycles significantly and undesirably increase the execution time of a sequence of logic stages.

Dynamic logic circuits must maintain a minimum clock frequency in order to insure proper functioning. Proper operation of dynamic logic circuits requires that an electrical charge be deposited and maintained in the circuits. In reality, the charge deposited in the logic circuits eventually will decay to an unknown logic level and thereby corrupt the state of the pipeline. The decay results from uncontrollable design and manufacture characteristics. In most practical situations, the preceding problem may be overcome via a periodic refresh cycle, similar to the refresh cycle in conventional dynamic random access memory (DRAM). Hence, a minimum clock rate, analogous to refresh cycles, must be maintained.

However, the minimum clock rate poses an additional problem. Many times, logic circuits are required to operate arbitrarily slow, "at DC." For instance, logic circuits may be required to operate slow during IC testing. Conventionally, dynamic logic circuits can be modified to exhibit slow operation by including "trickle charge" devices or "cross-coupled negative feedback" devices. However, these devices consume valuable computer real estate and further decrease the speed of the logic circuits.

Thus, a need exists in the industry for teachings that will permit the high performance pipelining of dynamic logic circuitry which adequately preserves data without the need for a minimum (refresh) clock rate.

SUMMARY OF THE INVENTION

A system and method is disclosed for enabling the pipelining of a plurality of logic stages comprised of dynamic mousetrap logic gates.

In accordance with the present invention, each pipeline stage is equipped with a latch. The latch is situated in series with and precedes each mousetrap logic stage of the pipeline.

The pipeline stages are alternately clocked by a clocking mechanism. While the even numbered pipeline stages are receiving a low clock signal for instigating precharge, the odd numbered pipeline stages are receiving a high clock signal for instigating data propagation, and vice versa.

In accordance with the present invention, the latch is designed to receive vector logic signals from the preceding pipeline stage during and after the high time accorded the pipeline stage.

In a specific implementation of the present invention, the latch comprises an input trigger mechanism for receiving the vector logic signals. A flip-flop mechanism is in communication with the input trigger mechanism. The flip-flop mechanism stores the vector logic signals. An output gating mechanism communicates with the flip-flop mechanism pursuant to a clock. The output gating mechanism outputs the vector logic signals. A latch enable pull-up mechanism enables the input trigger mechanism pursuant to the clock. An input trigger disabling mechanism disables the input trigger mechanism pursuant to the clock. Finally, a latch reset mechanism receives the vector logic signals and triggers the input trigger disabling mechanism.

FEATURES AND ADVANTAGES OF THE INVENTION

The present invention overcomes the deficiencies of the prior art, as noted above, and further provides for the following additional advantages.

Generally, the present invention teaches a system and method for the feasible pipelining of a family of dynamic logic gates, known as "mousetrap" logic gates.

The present invention permits the pipelining of mousetrap logic gates with insensitivity to clock asymmetry, or clock skew, resulting from the use of both clock edges. Specifically, mousetrap logic gates operating in a "disadvantaged" clock phase can steal time from logic circuits operating in an "advantaged" clock phase. The preceding terms and associated concepts are discussed in specific detail in the Detailed Description section of this document.

The present invention allows for operating a mousetrap logic pipeline at slow speeds, or at DC, for the purpose, among other things, of IC testing. In other words, no minimum clock rate need be maintained. The present invention can preserve data without a conventional periodic refresh cycle to the dynamic logic gates.

The applications envisioned for the present invention are endless. The present invention can be employed in any system requiring high speed logic manipulations. It is believed that the present invention is extremely desirable in any high latency logic operation. For example, floating point processors, which are conventionally being situated in or near a computer's CPU, have high latency as compared to integer operations. The present invention will enable putting a very high performance, floating point processor in a central processing unit in reasonable real estate. The high performance achieved is comparable to the speed achieved with much larger arithmetic coprocessors.

Further advantages of the present invention will become apparent to one skilled in the art upon examination of the following drawings and the detailed description. It is intended that any additional advantages be incorporated herein.

BRIEF DESCRIPTION OF THE DRAWINGS

The present invention, as defined in the claims, can be better understood with reference to the text and to the following drawings.

FIG. 9A shows a high level block diagram of a pipeline latch having a vector input and a vector output for the discussion of FIG. 9B;

FIG. 9B shows a state diagram for the pipeline latch of FIG. 9A;

DETAILED DESCRIPTION OF THE PREFERRED EMBODIMENT

Contents

Figure 1:
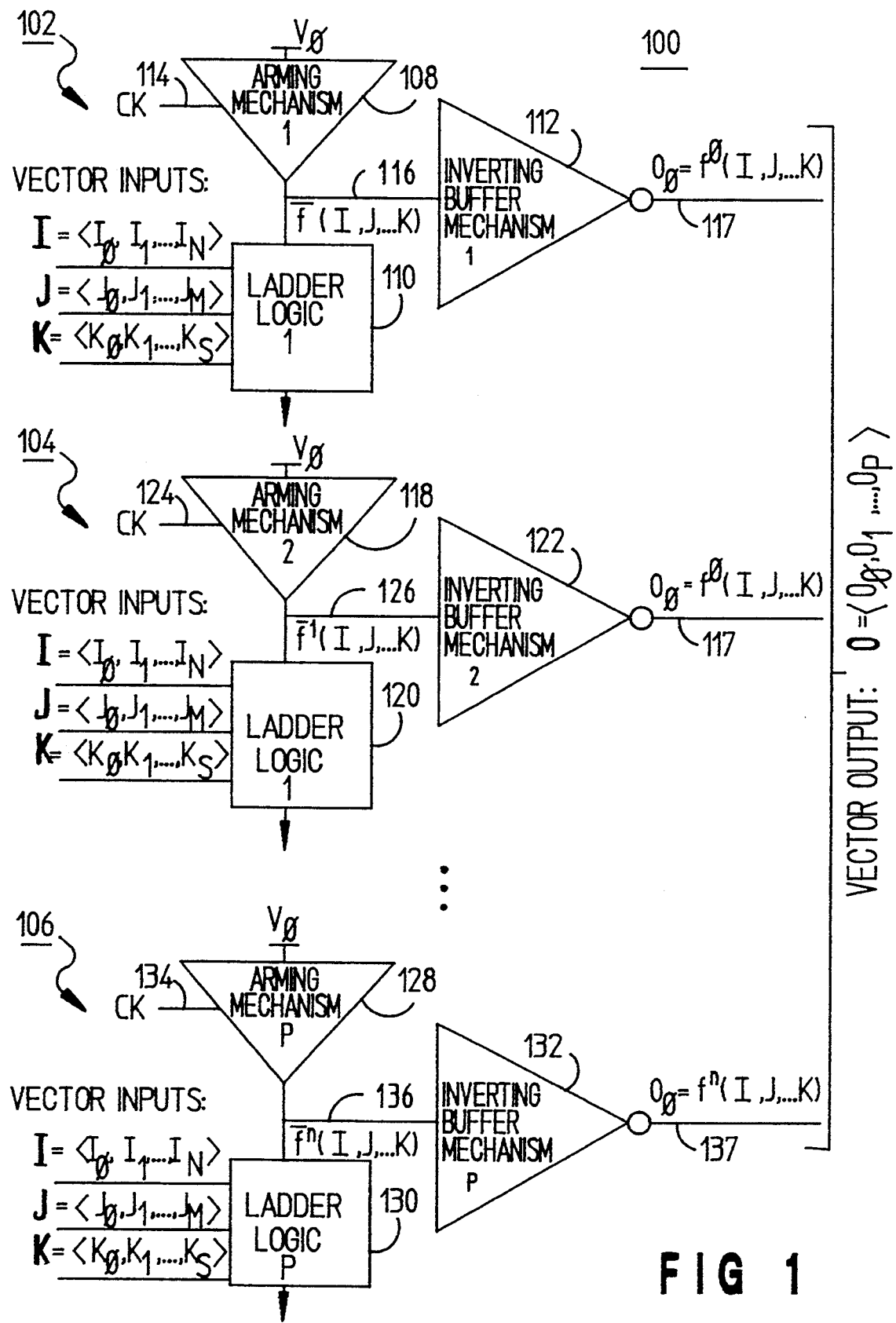
FIG. 1 illustrates a high level block diagram of a family of dynamic logic gates, called "mousetrap" logic gates, which can be pipelined in accordance with the present invention.

I. Logic System
  A. Vector Logic
  B. Mousetrap Logic Gates
    1. Architecture
    2. Operation
    3. Inclusive OR Gate
    4. Add Predecoder Gate
    5. Carry Propagate Gate
    6. Exclusive OR Gate
II. Pipelining of Mousetrap Logic Gates
  A. Overview of Pipelines
  B. Pipelining of the Present Invention
    1. Architecture
    2. Operation
  C. Latch State Machine of the Present Invention
  D. First Preferred Embodiment
    1. Architecture
    2. Operation
  E. Second Preferred Embodiment I. Logic System Mousetrap gates are the subject matter focused upon in copending application (Attorney Docket 190583) with commonality of inventorship to the present application. The present invention is essentially directed to, among other things, the pipelining of logic stages comprised of mousetrap logic gates, as presented in detail below. However, before pipelining is discussed, a description of mousetrap gates is warranted.

A. Vector Logic

Typically, logic in a computer is encoded in binary fashion on a single logic path, which is oftentimes merely an electrical wire or semiconductor throughway. By definition, a high signal level, usually a voltage or current, indicates a high logic state (in programmer's language, a "1"). Moreover, a low signal level indicates a low logic state (in programmer's language, a "0").

The present invention envisions implementing "vector logic" by pipelining mousetrap gates. Vector logic is a logic configuration where more than two valid logic states may be propagated through the logic gates in a computer. Unlike conventional binary logic having two valid logic states (high, low) defined by one logic path, the vector logic of the present invention dedicates more than one logic path for each valid logic state and permits an invalid logic state.

For example, in accordance with one embodiment, in a vector logic system requiring two valid logic states, two logic paths are necessary. When both logic paths are at a logic low, i.e., "0,0", an invalid logic state exists by definition. Moreover, a logic high existing exclusively on either of the two logic paths, i.e., "1,0" or "0,1" corresponds with the two valid logic states of the vector logic system. Finally, the scenario when both logic paths are high, i.e., "1,1", is an undefined logic state in the vector logic system.

In a vector logic system requiring three logic states in accordance with another embodiment, three logic paths would be needed, and so on. In conclusion, in accordance with the foregoing embodiment, a vector logic system having n valid logic states and one invalid state comprises n logic paths.

Furthermore, encoding of vector logic states could be handled by defining a valid vector logic state by a logic high on more than one logic path, while still defining an invalid state when all paths exhibit a low logic signal. In other words, the vector logic states are not mutually exclusive.

For example, in a vector logic system using a pair of logic highs to define each valid vector logic state, the following logic scheme could be implemented With three logic paths, "0,1,1" could designate a vector logic state 1, "1,0,1" a vector logic state 2, and "1,1,0" a vector logic state 3. With four logic paths, six valid vector logic states could be specified. With five logic paths ten valid vector logic states could be specified, and so on.

As another example, a vector logic system could be derived in accordance with the present invention wherein three logic highs define each valid vector logic state. Specifically, with four logic paths, "0,1,1,1" could designate a vector logic state 1, "1,1,1,0" a vector logic state 2, "1,1,0,1" a vector logic state 3, and "1,0,1,1" a vector logic state 4. With five logic paths, ten valid vector logic states could be specified, and so on.

B. Mousetrap Logic Gates

FIG. 1 illustrates a high level block diagram of a family of "mousetrap" logic gates in accordance with the present invention. Mousetrap logic gates, described in detail hereinafter, can implement vector logic at high speed, are functionally complete, are self-timed, and do not suffer adverse logic reactions resulting from static hazards when chained in a sequence of stages.

As shown in FIG. 1, each input to the mousetrap logic gate 100 of the present invention is a vector, denoted by vector inputs I, J, ..., K (hereinafter, vectors variables are in bold print). No limit exists as to the number of vector inputs I, J, ..., K. Further, each of vector inputs I, J, ..., K may be specified by any number of vector components, each vector component having a dedicated logic path denoted respectively in FIG. 1 by $I_0$–$I_N$, $J_0$–$J_M$, and $K_0$–$K_S$.

Essentially, each vector input specifies a vector logic state. As mentioned previously, an invalid vector logic state for any of the input vectors I, J, ..., K is present by definition when all of its corresponding vector components, respectively, $I_0$–$I_N$, $J_0$–$J_M$, and $K_0$–$K_S$, are at a logic low.

The output of the generic mousetrap logic gate 100 is also a vector, denoted by a vector output O. The vector output O is comprised of vector components $O_0$–$O_P$. The vector components $O_0$–$O_P$ are mutually exclusive and are independent functions of the vector inputs I, J, ..., K. Further, the vector components $O_0$–$O_P$ have dedicated mousetrap gate components 102–106, respectively, within the mousetrap logic gate 100. By definition in the present invention, one and only one of $O_0$–$O_P$ is at a logic high at a any particular time.

Moreover, no limit exists in regard to the number of vector components $O_0$–$O_P$ which can be associated with the output vector O. The number of vector components $O_0$–$O_P$ and thus mousetrap gate components 102–106 depends upon the logic function to be performed on the vector inputs individually or as a whole, the number of desired vector output components, as well as other considerations with respect to the logical purpose of the mousetrap logic gate 100.

1. Architecture

With reference to FIG. 1, each mousetrap gate component 102–106 of the mousetrap logic gate 100 comprises an arming mechanism 108, ladder logic 110, and an inverting buffer mechanism 112. The arming mechanism 108 is a precharging means, or energizing means, for arming and resetting the mousetrap logic gate 100.

The arming mechanism 108 essentially serves as a switch to thereby selectively impose a voltage $V_0$ defining a logic state on a line 116 upon excitation by a clock signal (high or low) on line 114. As known in the art, any type of switching element or buffer for selectively applying voltage based upon a clock signal can be used. Furthermore, when the logic of a computer system is based upon current levels, rather than voltage levels, then the arming mechanism 108 could be a switchable current source, which is also well known in the art. Any embodiment serving the described switching function as the arming mechanism 108 is intended to be incorporated herein.

The ladder logic 110 is designed to perform a logic function on the vector inputs I, J, ..., K. The ladder logic 110 corresponding to each mousetrap gate component 102–106 may vary depending upon the purpose of each mousetrap gate component 102–106. In the preferred embodiment, the ladder logic 110 is essentially a combination of simple logic gates, for example, logic OR gates and/or logic AND gates, which are connected in series and/or in parallel. It should be noted that the ladder logic 110 is configured in the present invention so that one and only one of the vector output components $O_0$–$O_P$ is at a logic high at any sampling of a valid vector output O. Specific implementations of the ladder logic 110 are described below in regard to the illustrations of FIGS. 2-5.

The ladder logic 110 must operate at high speed because it resides in the critical logic path, unlike the arming mechanism 108 which initially acts by arming the mousetrap gate component, but then sits temporarily dormant while data actually flows through the mousetrap gate component, i.e., through the critical logic path. Furthermore, because the ladder logic 110 resides in the critical logic path which is essentially where the logical intelligence is positioned, a plurality of logic gates are generally required to implement the desired logic functions.

Also residing in the logic path is the inverting buffer mechanism 112. The inverting buffer mechanism 112 primarily serves as an invertor because in order to provide complete logic functionality in the mousetrap gate 100, it is necessary to have an inversion function in the critical logic path. Moreover, the inverting buffer mechanism 112 provides gain to the signal residing on line 114 and provides isolation between other potential stages of mousetrap gate components similar to the mousetrap logic gate components 102–106 of FIG. 1. The inverting buffer mechanism 112 is characterized by a high input impedance and low output impedance. Any buffer embodiment serving the described function as the buffer mechanism 112 is intended to be incorporated herein.

Furthermore, worth noting is that the arming mechanism 108, the ladder logic 110, and the inverting buffer mechanism 112 could in some implementations all reside on a single integrated circuit (IC), for example, an application specific integrated circuit (ASIC) or microprocessor chip.

2. Operation

The operation of the mousetrap logic gate 100 is described below at a high conceptual level in regard to only the mousetrap gate component 102 for simplicity. The narrowing of the present discussion is well grounded, because the various mousetrap gate components 102–106 are essentially redundant with the exception of their corresponding ladder logic functions implemented by ladder logics 110, 120, and 130. Consequently, the following discussion is equally applicable to the remaining mousetrap gate components 104 and 106.

In operation, upon excitation by a clock CK on the line 114, the arming mechanism 108 pulls up, or drives, the output 116 of the ladder logic 110 to a logic high. Concurrently, the arming mechanism 108 pulls the input at line 114 to the inverting buffer mechanism 112 to a logic high. Consequently, the corresponding vector component $O_0$ on a line 117 is maintained at a logic low, defined in the present invention as an invalid state. In the foregoing initial condition, the mousetrap logic gate 100 can be analogized as a "mousetrap," in the traditional sense of the word, which has been set and which is waiting to be triggered by the vector inputs I, J, . . . , K.

The mousetrap logic gate 100 will remain in the armed predicament with the vector component $O_0$ in the invalid state, until being triggered by the ladder logic 110. The mousetrap logic gate 100 is triggered upon receiving enough valid vector inputs I, J, . . . , K to definitively determine the correct state of the vector component $O_0$ on the line 117. In some designs of the ladder logic 110, not all of the vector inputs will need to be considered in order to produce an output signal on line 116, and hence, on line 117. The number of vector inputs I, J, . . . , K needed to make the definitive determination of the output state and also the timing of the determination is defined by the content and configuration of the simple logic gates within the ladder logic 110.

After the vector component $O_0$ on line 117 is derived, it is passed onto the next stage (not shown) of logic. The mousetrap logic gate component 102 will not perform any further function until being reset, or re-armed, or refreshed, by the arming mechanism 108. In a sense, the timing from mousetrap gate component to mousetrap gate component as well as gate to gate depends upon the encoded data itself. In other words, the mousetrap gate components are "self-timed."

Mousetrap logic gates in accordance with the present invention directly perform inverting and non-inverting functions. Consequently, in contrast to conventional dynamic logic gates, mousetrap logic gates can perform multiplication and addition, which require logic inversions, at extremely high speeds.

Finally, it should be noted that the family of mousetrap logic gates 100 can be connected in electrical series to derive a combinational logic gate which will perform logic functions as a whole. Thus, a mousetrap gate component, comprising an arming mechanism, ladder logic, and an inverting buffer mechanism, can be conceptualized as the smallest subpart of a mousetrap logic gate. Moreover, various mousetrap gate components can be connected in series and/or in parallel to derive a multitude of logic gates.

However, when mousetrap logic gates are chained together in long chains (perhaps, greater than two or three mousetrap gate components in series), precharging of the chains might require an undesirable lengthy amount of time. The reason is that mousetrap gate components will not be able to pull their output low (invalid) until their input is pulled low. The result is that the mousetrap gate components will charge in sequence from the first to the last in the chain, thereby undesirably slowing the precharge of the overall chain. Hence, a way is needed to cause the mousetrap gate components of a chain to precharge in parallel, not in sequence.

Parallel precharging can be accomplished several different ways. A preferred way is to provide a clock triggered n-channel MOSFET to disable the ladder logics 110, 120, and 130 of FIG. 1 during the precharging of the mousetrap gate components. In other words, a push-pull situation is implemented. The arming mechanism of a mousetrap gate component pulls (precharges) the input to the inverting buffer mechanism high, while the inserted n-channel MOSFET pulls the ladder logic low.

It should be noted that the n-channel MOSFET slightly slows the operation of the mousetrap gate component. However, it should be emphasized that the n-channel MOSFET need not be implemented for every mousetrap gate component. It need only be inserted every second or third mousetrap gate component in series. Moreover, in certain logic circuits, such as multiplication, the parallelism of the logic operation may be exploited to reduce the number of requisite n-channel MOSFETs.

The foregoing embodiment for providing parallel precharging has advantages. It requires little additional power dissipation. Moreover, it can, if desired, be uniformly applied to all mousetrap gate components for simplicity.

Another preferred way of providing for parallel precharging of mousetrap gate components chained in series is to periodically insert a mousetrap AND gate in the critical logic path. The mousetrap AND gate is inputted (1) an output vector component from a preceding mousetrap gate component and (2) the precharge clock. The output of the mousetrap AND gate is inputted to the next in series mousetrap gate component.

3. Inclusive OR Gate

Figure 2:
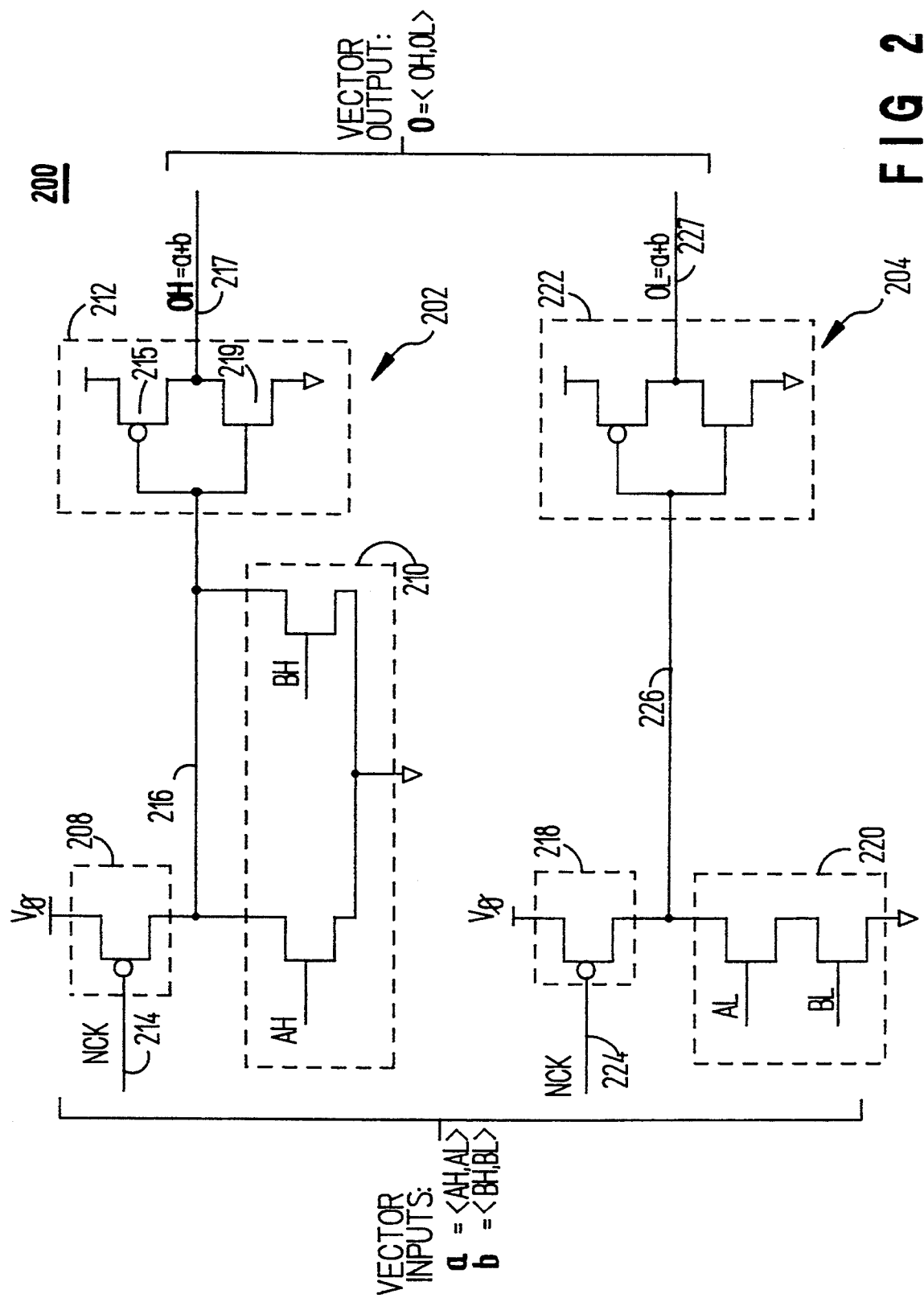
FIG. 2 illustrates a low level block diagram of a two-input inclusive OR mousetrap logic gate in accordance with FIG. 1.

FIG. 2 shows a low level block diagram of an example of a two-input inclusive OR mousetrap logic gate 200 in accordance with the present invention of FIG. 1. The inclusive OR mousetrap logic gate 200 can be used in a vector logic system having two logic states and one invalid logic state.

As shown, the inclusive OR mousetrap logic gate 200 has two mousetrap gate components 202 and 204. The mousetrap gate component 202 comprises an arming mechanism 208, ladder logic 210, and an inverting buffer mechanism 212. The mousetrap gate component 204 comprises an arming mechanism 218, ladder logic 220, and an inverting buffer mechanism 222. Note the similarity of reference numerals with regard to FIG. 1, as well as with the other figures to follow.

The inclusive OR mousetrap logic gate 200 and specifically, the arming mechanisms 208 and 218, is armed by command of a clock NCK ("N" denotes active at logic low) on respective lines 214 and 224. In the preferred embodiments of the present invention, the arming mechanisms 208 and 218 are p-channel metal-oxide-semiconductor field-effect transistors (MOSFET), as shown in FIG. 2, which are well known in the art and are commercially available. N-channel MOSFETs could be used instead of p-channel MOSFETs; however, the clocking obviously would be diametrically opposite.

With reference to FIG. 2, the MOSFETs comprising the arming mechanisms 208 and 218 essentially serve as switches to thereby impose a voltage V0 on respective lines 216 and 226 upon excitation by a low clock NCK signal on respective lines 214 and 224. As further known in the art, any type of switching element for voltage can be used.

Additionally, in the preferred embodiments, the simple logic in the ladder logics 210 and 220 is implemented with n-channel MOSFETs, as shown. The rationale for using n-channel MOSFETs is as follows. N-channel MOSFETs have superior drive capabilities, space requirements, and load specifications, than comparable p-channel MOSFETs. A typical n-channel MOSFET can generally switch approximately fifty percent faster than a comparable p-channel MOSFET having similar specifications.

Furthermore, in the preferred embodiments, the inverting buffer mechanisms 212 and 222 are static CMOSFET invertors, as shown in FIG. 2, which are well known in the art and are commercially available. A CMOSFET invertor is utilized for several reasons. As stated previously, an inversion must take place in the critical logic path in order to provide functional completeness. The inversion which must take place in the critical path can be accomplished by cleverly manipulating the design (gain) of a conventional CMOSFET invertor, which comprises both a p-channel MOSFET pull-up 215 and an n-channel MOSFET pull-down 219. In other words, because of the known existence of a monotonic progression, the ratio of the width of the MOSFET gates, situated between the source and the drain, can be designed to favor switching in one direction [i.e., either high (1) to low (0) or low (0) to high(1)], at the expense of the other direction.

Specifically, in the particular CMOSFET invertor envisioned by the present invention, the gate width of the constituent p-channel MOSFET 215 is made wider than the gate width of the constituent n-channel MOSFET 219. Consequently, the CMOSFET invertor switches very quickly from a logic high (1; the armed state of the mousetrap) to a logic low (0; the unarmed state of the mousetrap). The speed of the CMOSFET invertor switching from a logic low to a logic high does not matter because the mousetrap gate 200 is precharged during this time period. Hence, the mousetrap logic gate 200 can be constructed to exhibit superior performance and size specifications in one direction, to thereby tremendously increase the speed of data transfer and reduce the size specifications of the mousetrap logic gate 200.

With respect to operation, a truth table for the inclusive OR mousetrap logic gate 200 is set forth in Table A hereinafter.

TABLE A

| a | b | O | AH | AL | BH | BL | OH | OL |
|---|---|---|---|---|---|---|---|---|
| inv | x | inv | 0 | 0 | x | x | 0 | 0 |
| x | inv | inv | x | x | 0 | 0 | 0 | 0 |
| 0 | 0 | 0 | 0 | 1 | 0 | 1 | 0 | 1 |
| 0 | 1 | 1 | 0 | 1 | 1 | 0 | 1 | 0 |
| 1 | 0 | 1 | 1 | 0 | 0 | 1 | 1 | 0 |
| 1 | 1 | 1 | 1 | 0 | 1 | 0 | 1 | 0 |

In the above Table A, "x" denotes a an irrelevant or "don't care" situation; "inv" denotes an invalid logic state; "1" denotes a high logic state; and "0" denotes a low logic state.

As indicated in Table A and shown in FIG. 2, a vector input a and a vector input b are operated upon by the inclusive OR mousetrap logic gate 200 to derive a vector output O. For discussion purposes, it is worth noting that vector input a, vector input b, and vector output O could correspond respectively with vector input I, vector input J, and vector output O of FIG. 1.

Vector input a specifies a vector logic state defined by two vector components AH and AL. Vector input b specifies a vector logic state defined by two other vector components BH and BL. Vector output O specifies a vector logic state defined by two vector components OH and OL, which collectively describe the inclusive disjunction (OR function) of vector inputs a and b. In vector notation, as shown, a=<AH,AL>; b=<BH,BL>; and O=<OH,OL>=a+b.

4. Add Predecoder Gate

Figure 3:
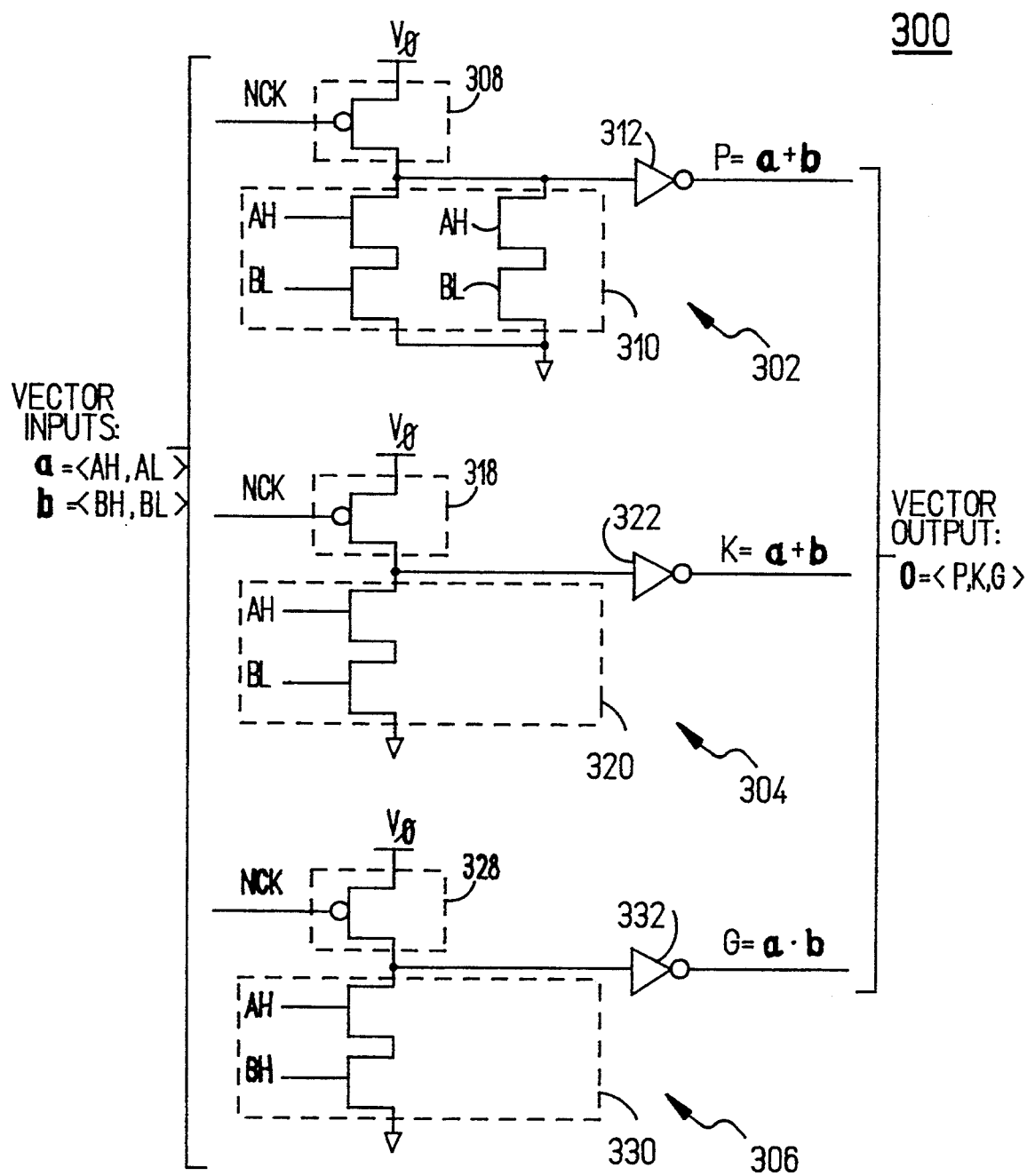
FIG. 3 illustrates a low level block diagram of a two-input add predecoder mousetrap logic gate in accordance with FIG. 1.

FIG. 3 shows a low level block diagram of a two-input add predecoder mousetrap logic gate 300 in accordance with the present invention of FIG. 1. Well known in the art, a predecoder is logic primarily used in the arithmetic logic unit (ALU) to perform arithmetic functions, especially addition. Generally, a predecoder aids in parallel processing and facilitates control of a carry bit path.

As shown, the predecoder 300 has three mousetrap gate components 302–306. Respectively, the three mousetraps gates 302–306 comprise the following: (1) an arming mechanism 308, ladder logic 310, and a buffer 312; (2) an arming mechanism 318, ladder logic 320, and a buffer 322; and (3) an arming mechanism 328, ladder logic 330, and a buffer 332.

A truth table describing the operation of the add predecoder logic gate 300 is set forth in Table B hereinafter.

TABLE B

| a | b | O | AH | AL | BH | BL | P | K | G |
|---|---|---|----|----|----|----|---|---|---|
| inv | x | inv | 0 | 0 | x | x | 0 | 0 | 0 |
| x | inv | inv | x | x | 0 | 0 | 0 | 0 | 0 |
| 0 | 0 | kill | 0 | 1 | 0 | 1 | 0 | 1 | 0 |
| 0 | 1 | prop | 0 | 1 | 1 | 0 | 1 | 0 | 0 |
| 1 | 0 | prop | 1 | 0 | 0 | 1 | 1 | 0 | 0 |
| 1 | 1 | gen | 1 | 0 | 1 | 0 | 0 | 0 | 1 |

Similar to the inclusive OR mousetrap logic gate 200 of FIG. 2, vector input a specifies a vector logic state defined by two vector components AH and AL. Vector input b specifies a vector logic state defined by two other vector components BH and BL. However, in contrast to the mousetrap logic gate of FIG. 2, vector output O specifies a vector logic state defined by three vector components P, K, and G, discussed in detail below. In vector notation, as shown, a=<AH,AL>; b=<BH,BL>; and O=<P,K,G>.

Conventional predecoders are usually designed so that the output indicates only one of two logic states. In many implementations, the conventional predecoder indicates either that the carry should be "propagated" (designated by "P") or that the carry bit should be "killed" (designated by "K"). In other implementations, the predecoder indicates either that the carry should be "propagated" or that the carry bit should be "generated" (designated by "G").

In the present invention, as noted in Table B, the vector output O can indicate any of four logic states: an invalid state and three valid states, namely, kill, propagate, or generate.

Furthermore, the add predecoder logic gate 300 must perform an exclusive OR function as part of the overall predecoder function. Conventionally, dynamic logic gates could not implement the exclusive OR function because static hazards would cause logic errors. Static hazards occur in combinational logic configurations because of propagation delays. The mousetrap logic gates of the present invention are not adversely affected by static hazards, because of selftiming. No valid vector component output is present unless all the vector inputs, needed to definitively determine the output of the ladder logic, are valid as indicated in Table B.

5. Carry Propagate Gate

Figure 4:
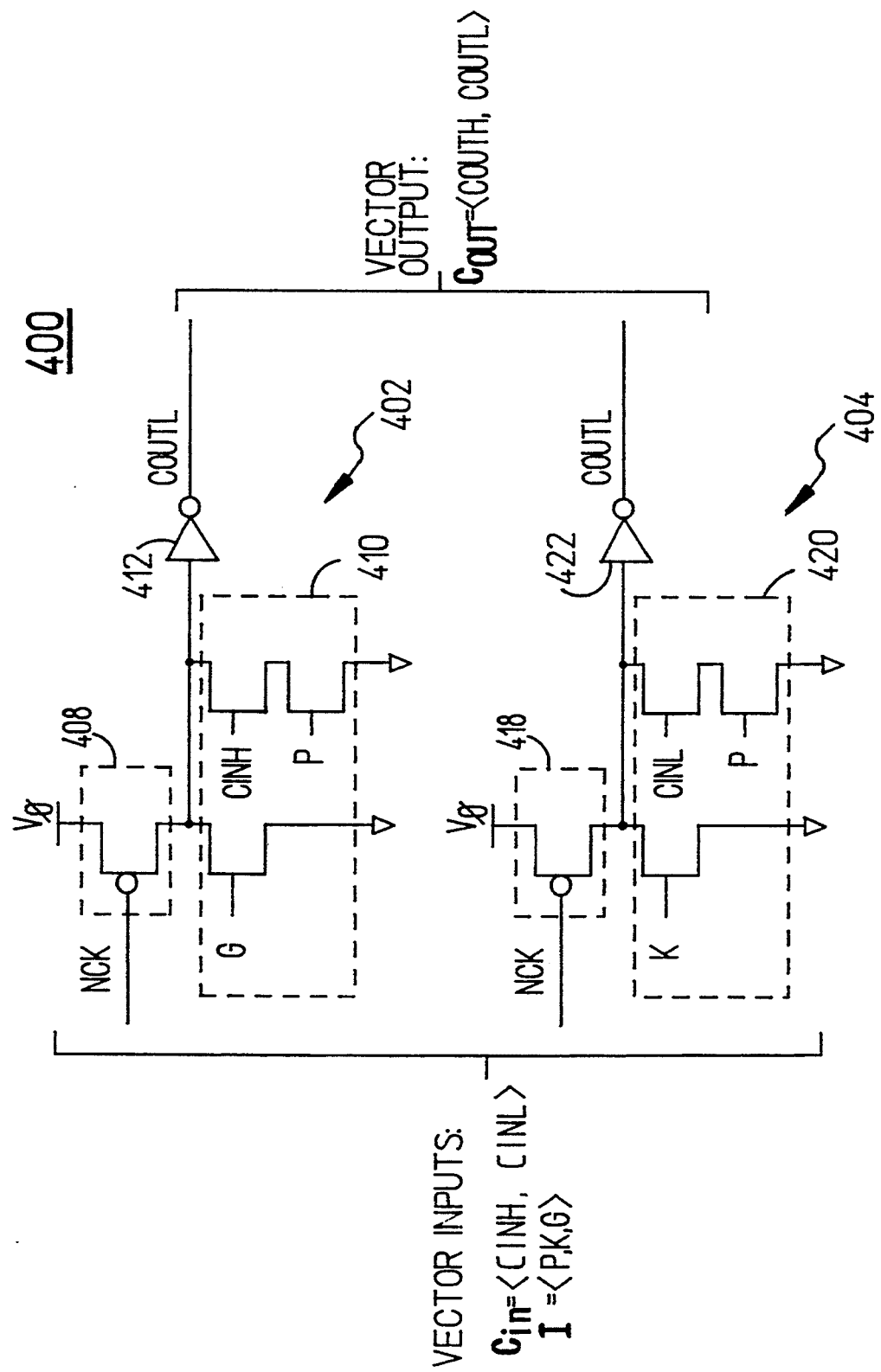
FIG. 4 illustrates a low level block diagram of a carry propagate mousetrap logic gate in accordance with FIG. 1 and for use series with the add predecoder mousetrap logic gate of FIG. 3.

FIG. 4 shows a low level block diagram of a carry propagate gate 400 in accordance with the present invention. Well known in the art, a carry propagate logic gate is oftentimes used in series with an add predecoder logic gate, as discussed previously, in order to control a carry bit path in an ALU. Specifically, the carry propagate gate 400 functions in series with the add predecoder logic gate 300 in the preferred embodiment to provide a high performance carry bit path.

The carry propagate gate 400 has two mousetrap gate components 402 and 404. The mousetrap gate component 402 comprises an arming mechanism 408, ladder logic 410, and an inverting buffer mechanism 412. The mousetrap gate component 404 comprises an arming mechanism 418, ladder logic 420, and an inverting buffer mechanism 422.

To further clarify the functionality of the carry propagate gate 400, a truth table for the carry propagate gate 400 is set forth in Table C hereinafter.

TABLE C

| I | CIN | COUT | P | K | G | CINH | CINL | COUTH | COUTL |
|---|-----|------|---|---|---|------|------|-------|-------|
| inv | x | inv | 0 | 0 | 0 | x | x | 0 | 0 |
| x | inv | inv | x | x | x | 0 | 0 | 0 | 0 |
| kill | x | 0 | 0 | 1 | 0 | x | x | 0 | 1 |
| prop | 0 | 0 | 1 | 0 | 0 | 0 | 1 | 0 | 1 |
| prop | 1 | 1 | 1 | 0 | 0 | 1 | 0 | 1 | 0 |
| gen | x | 1 | 0 | 0 | 1 | x | x | 1 | 0 |

6. Exclusive OR Gate

Figure 5:
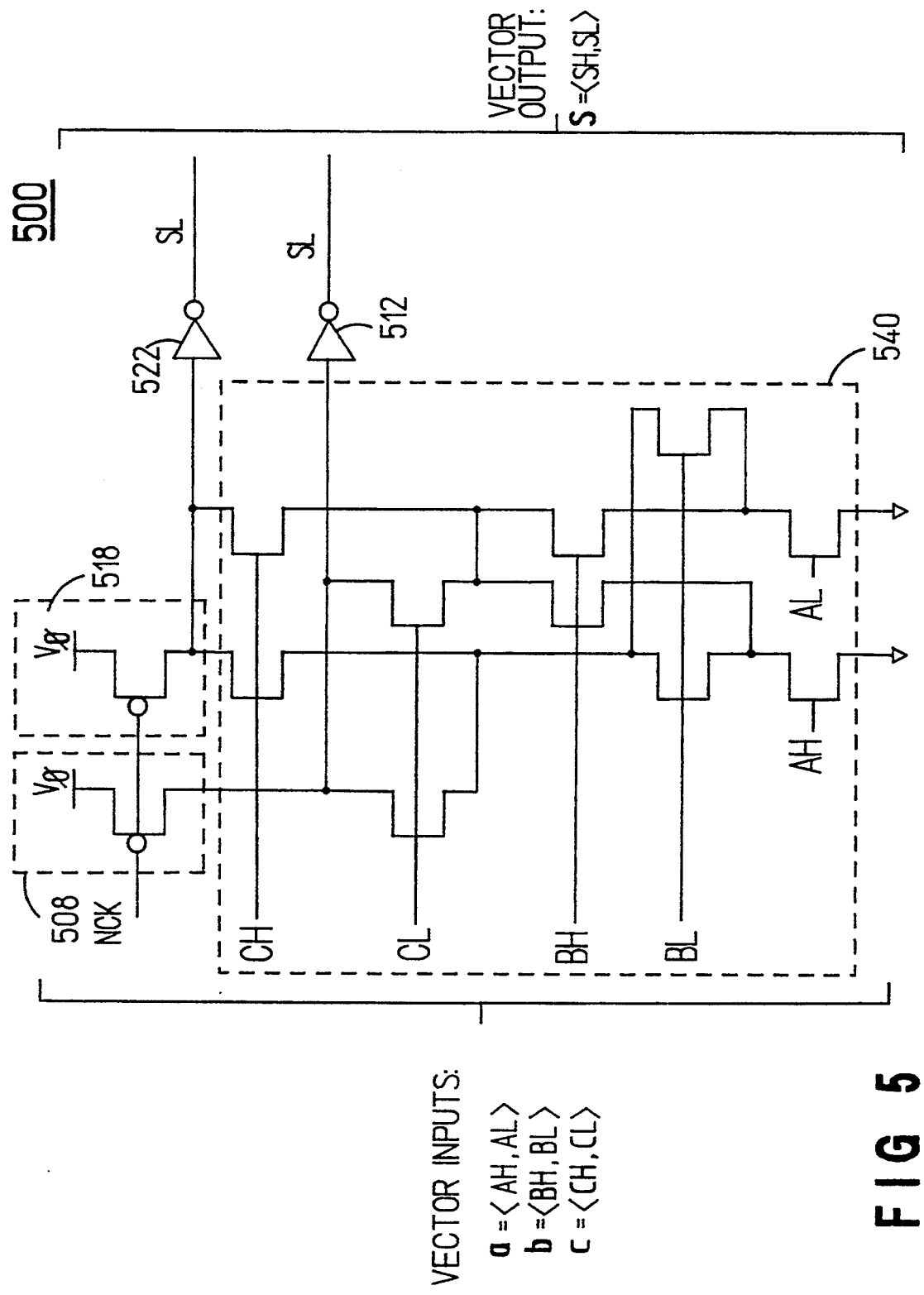
FIG. 5 illustrates a low level block diagram of a three-input exclusive OR mousetrap logic gate in accordance with FIG. 1, the three-input exclusive OR mousetrap logic gate for sum generation in a full adder.

FIG. 5 shows a low level block diagram of a three-input exclusive OR mousetrap logic gate 500 in accordance with the present invention. The exclusive OR mousetrap logic gate 500 can be used for high speed sum generation in either a full or half adder and does not suffer from any adverse effects from static hazards. Sum generation logic gates are well known in the art. They are especially useful in adder and multiplier logic circuits.

The exclusive OR logic gate 500 has two mousetrap gate components 502 and 504, having respective arming mechanisms 508 and 518 as well as inverting buffer mechanisms 512 and 522. However, as shown by a phantom block 540, the ladder logic associated with each of the two mousetrap gate components 502 and 504 is not separated completely in hardware, but remains mutually exclusive in a logic sense. Hence, as a general proposition, because the ladder logic in each mousetrap gate component of a mousetrap logic gate uses the same type of gates, namely, n-channel MOSFETs, sometimes their logic functions can share the same hardware, thereby resulting in a less number of total gates and a reduction in utilized computer real estate.

A truth table indicating the operation of the exclusive OR logic gate 500 is set forth in Table D hereinafter.

TABLE D

| a | b | c | s | AH | AL | BH | BL | CH | CL | SH | SL |
|---|---|---|---|----|----|----|----|----|----|----|----|
| inv | x | x | inv | 0 | 0 | x | x | x | x | 0 | 0 |
| x | inv | x | inv | x | x | 0 | 0 | x | x | 0 | 0 |
| x | x | inv | inv | x | x | x | x | 0 | 0 | 0 | 0 |
| 0 | 0 | 0 | 0 | 0 | 1 | 0 | 1 | 0 | 1 | 0 | 1 |
| 0 | 0 | 1 | 1 | 0 | 1 | 0 | 1 | 1 | 0 | 1 | 0 |
| 0 | 1 | 0 | 1 | 0 | 1 | 1 | 0 | 0 | 1 | 1 | 0 |
| 0 | 1 | 1 | 0 | 0 | 1 | 1 | 0 | 1 | 0 | 0 | 1 |
| 1 | 0 | 0 | 1 | 1 | 0 | 0 | 1 | 0 | 1 | 1 | 0 |
| 1 | 0 | 1 | 0 | 1 | 0 | 0 | 1 | 1 | 0 | 0 | 1 |
| 1 | 1 | 0 | 0 | 1 | 0 | 1 | 0 | 0 | 1 | 0 | 1 |

TABLE D-continued

| a | b | c | s | AH | AL | BH | BL | CH | CL | SH | SL |
|---|---|---|---|----|----|----|----|----|----|----|----|
| 1 | 1 | 1 | 1 | 1  | 0  | 1  | 0  | 1  | 0  | 1  | 0  |

As indicated in Table E and shown in FIG. 5, vector input a specifies a vector logic state defined by two vector components AH and AL. Vector input b specifies a vector logic state defined by two other vector components BH and BL. Vector input c specifies a vector logic state defined by two vector components CH and CL. Furthermore, vector output s specifies a vector logic state defined by two outputs SH and SL. In vector notation, as shown, a=<AH,AL>; b=<BH,BL>; c=<CH,CL>; and s=<SH,SL>.

II. Pipelining Mousetrap Logic Circuits

A. Overview of Pipelines

The pipelining of logic stages comprised of static logic gates is well known in the art. "Static" logic gates are traditional logic gates which do not require a periodic precharge to maintain a proper logic state. In general, "pipelining" refers to the process of commencing a new operation prior to the completion of an outstanding, or in-progress, operation for the purpose of increasing the rate of data processing and throughput.

Figure 6:
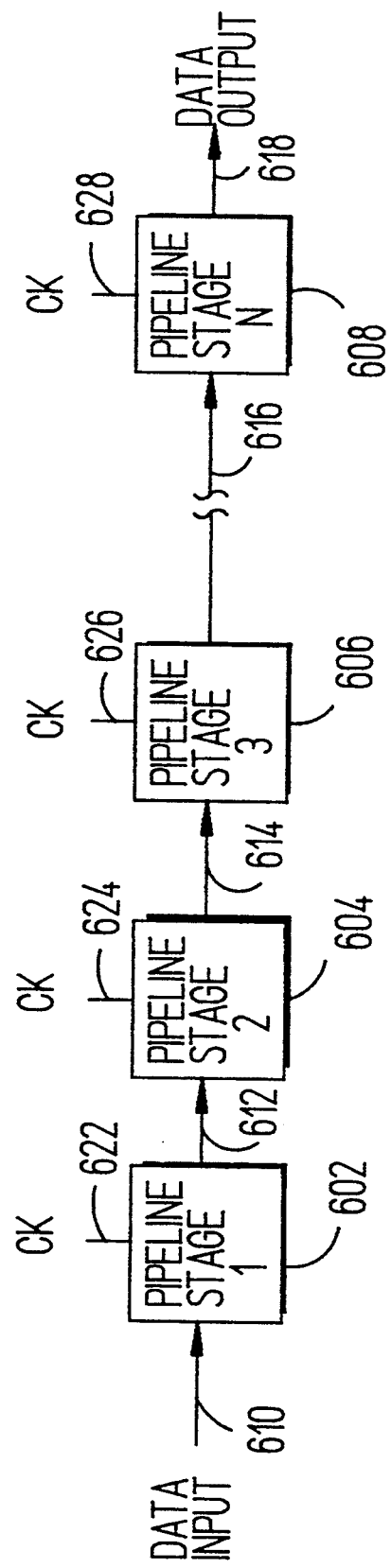
FIG. 6 illustrates a high level block diagram of a sequence of pipeline stages forming a pipeline.

FIG. 6 illustrates a conventional pipeline (or section of a pipeline) 600 of N pipeline stages 602–608 in sequence. Each of the pipeline stages 602–608 comprises any number of stages of logic gates. Data is introduced into the pipeline 600 as indicated by an arrow 610. The data ultimately travels through and is independently processed by each of the pipeline stages 602–608 of the sequence, as shown by successive arrows 612–618.

Data is clocked through the pipeline 600 via clocks 622–628, which could be identical or staggered in phase as desired. Usually, successive pipeline stages are uniformly triggered by the same clock edge (either rising or falling) and are clocked a full cycle (360 degrees) out of phase.

With respect to FIG. 6, pipelining means that new data is clocked into the pipeline 600, as indicated by the arrow 610, while old data is still remaining in the pipeline 600 being processed. Pipelining increases the useful bandwidth of high latency logic networks.

Pipelining is often implemented to perform arithmetic operations, including floating point operations. For example, to perform multiplication, a "carry save adder" pipeline of logic stages is usually employed. Specifically, each pipeline stage is essentially several rows of conventional full adder logic stages. Moreover, each full adder compresses three partial products into two partial products. Thus, each full adder adds in another partial product as data flows through the chain of full adder logic stages in each pipeline stage. In order to perform a single multiplication operation, more than one clock cycle is usually required, but as a result of pipelining, a new multiplication operation may be commenced generally in substantially less than, perhaps in half of, the total number of clock cycles.

The pipelining of dynamic logic gates, particularly mousetrap logic gates shown in FIG. 1, poses peculiar problems, unlike in the pipelining of static logic gates. With reference to FIG. 1, mousetrap logic gates 100 require a precharge cycle in order to arm the mousetrap gate components 102–106, rendering them potentially operative. Effectively, a precharge cycle periodically interrupts the useful work cycle for the necessary purpose of maintenance. Precharge cycles significantly and undesirably decrease the useful bandwidth of a sequence of mousetrap pipeline stages.

Moreover, if attempts are made to use both clock edges (rising and falling), as envisioned by the present invention, in order to hide the precharge during the "off duty" clock time of a pipeline stage (when the pipeline stage is not propagating data), then the mousetrap logic gates are adversely affected by a phenomenon known as "clock asymmetry." This concept is discussed in detail with respect to FIG. 7 below.

Figure 7:
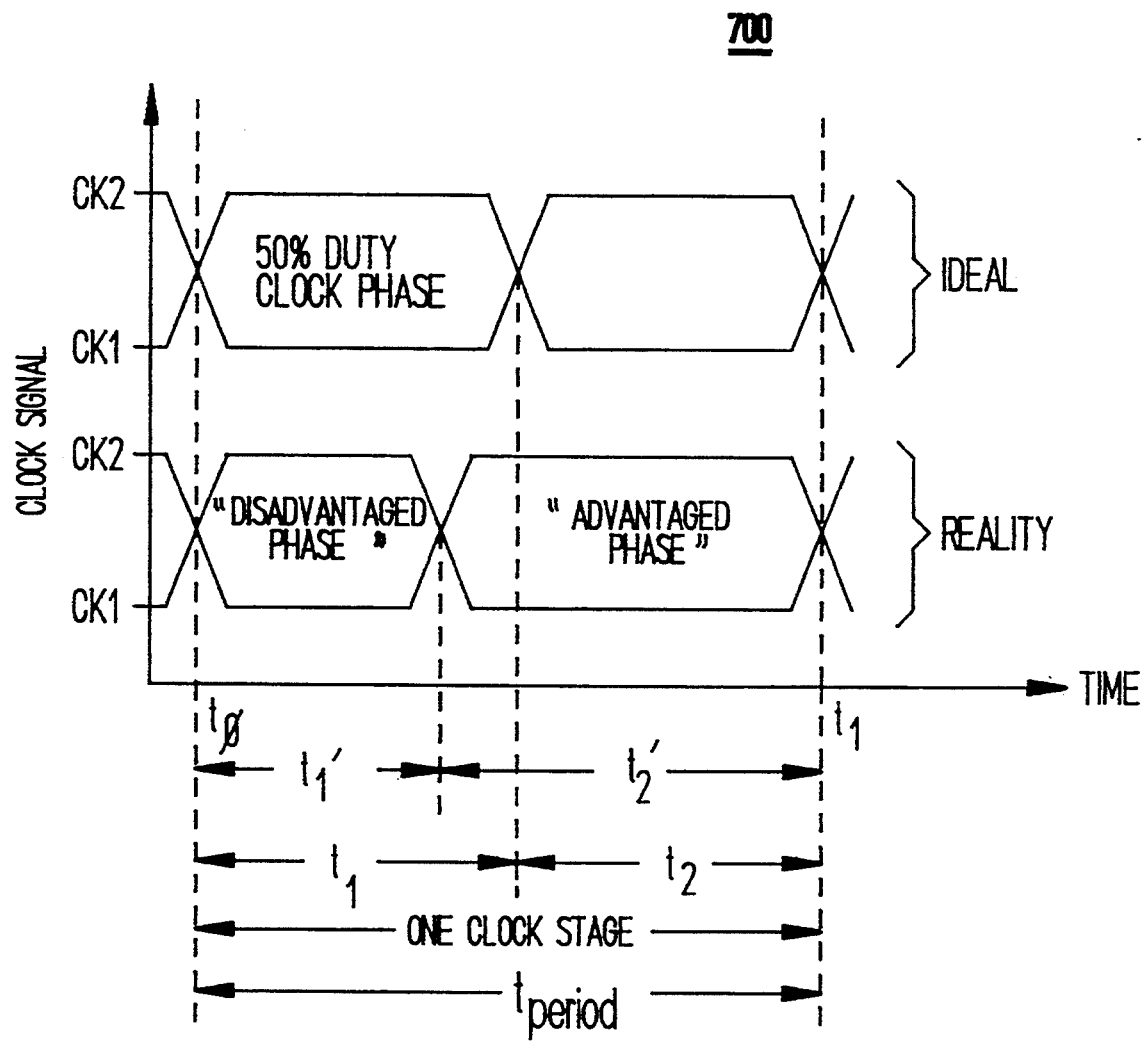
FIG. 7 illustrates graphically the relationship and the inherent clock asymmetry between the two clocks in the preferred embodiments wherein advantaged and disadvantaged clock phases arise.

FIG. 7 graphically illustrates a possible two clock system which may be employed with the pipeline 600 of FIG. 6. In the hypothetical scenario, the odd numbered logic stages of the N logic stages 602–608 are clocked by a clock CK1. Moreover, the even numbered logic stages are clocked by a clock CK2. The two clock system is desirable in order to hide the precharge delay from the forward logic path, as envisioned by the present invention.

As shown in FIG. 7, clocks CK1 and CK2 are intended by design to switch simultaneously, to be ideally alternating (180 degrees out of phase), and to have a 50 percent duty cycle with respect to one clock state ($t_{period}$) of the computer system's clock. However, because of unavoidable clock asymmetry, an "advantaged phase" ($t_1'$) and a "disadvantaged phase" ($t_2'$) will arise in reality, as comparatively shown in FIG. 7.

Generally, clock asymmetry results from inherent physical inequities in the manufacture of clock generation circuits. The condition results when the pipeline stages 602–608 of FIG. 6 are alternately clocked and with each, by design, having a fifty percent duty cycle. A precise time allocation (duty cycle) to the individual pipeline stages 602–608 of FIG. 6 can never be achieved. A precise allocation or clocking of time to insure that each pipeline stage 602–608 of the pipeline 600 has an identical duty cycle is important because it tremendously affects the useful bandwidth of the pipeline 600.

The pipeline 600 will function with the two clock system of FIG. 7, but the cycle time for the pipeline 600 will be limited by the period of the disadvantaged phase. In other words, the speed of pipeline 600 is less than optimal because valuable time is wasted in the pipeline stages (either even or odd) operating in the advantaged phase. More time is accorded to the pipeline stages corresponding with the advantaged phase than is necessary for complete operation of the pipeline stages. Worth noting is that the clock asymmetry cannot be compensated for by balancing delays in the pipeline stages because the direction of the time deviation cannot be known.

If pipeline 600 used pipeline stages 602–608 having static logic gates, such as conventional edge-triggered latch paradigm systems, clock asymmetry is not a problem because only one of the clock edges, i.e., either the rising or falling clock edge, is utilized for clocking each pipeline stage. The problem is solved because the time period separating two parallel clock edges can be precisely controlled with simple and inexpensive conventional circuitry.

However, in regard to dynamic logic gates, such as mousetrap logic gates 100 as shown in FIG. 1, the foregoing solution is not desirable because optimally both clock edges should perform a purpose (either precharge or propagation) in order to achieve high performance by hiding the precharging operation from the forward logic path.

B. Pipeline of the Present Invention

1. Architecture

Figure 8:
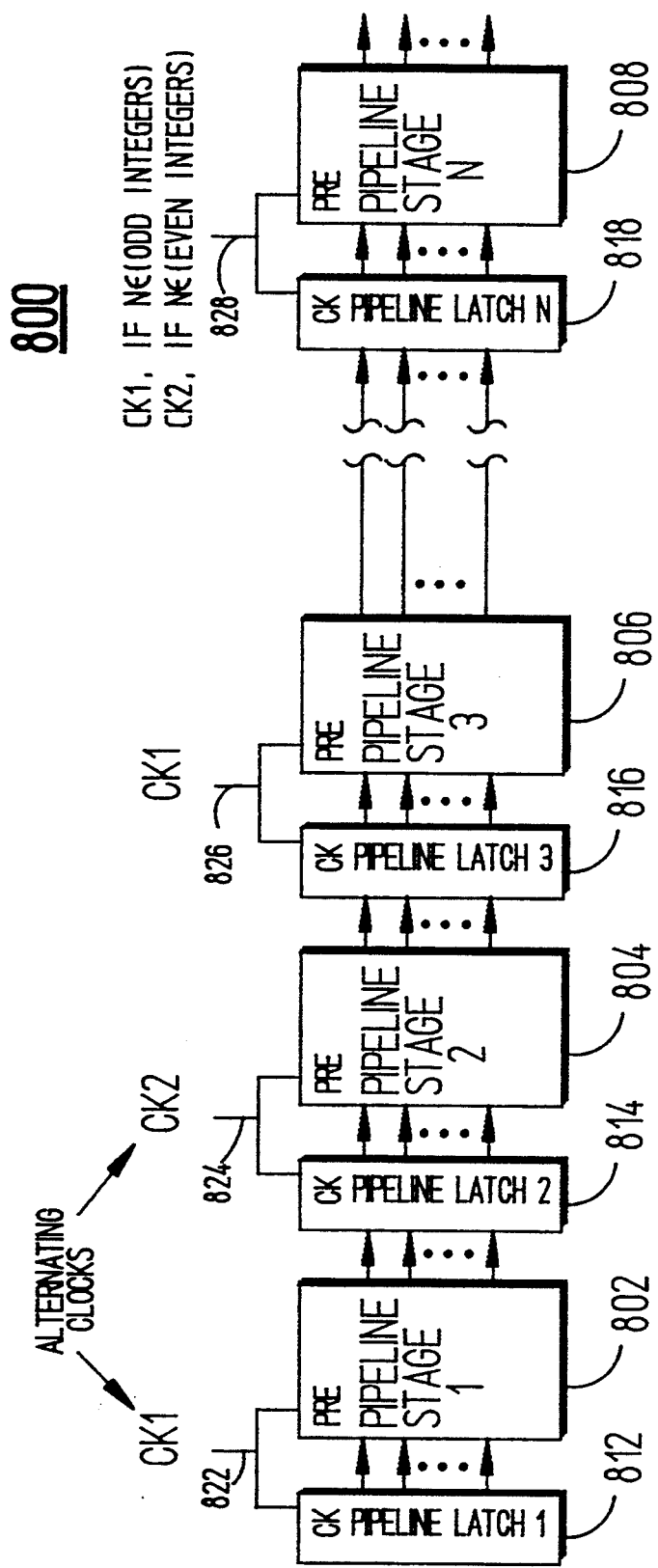
FIG. 8 illustrates a high level block diagram of a pipeline of mousetrap pipeline stages in accordance with the present invention.

FIG. 8 illustrates a high level block diagram of a pipeline 800 of N mousetrap pipeline stages 802-808 in accordance with the present invention. Each of the mousetrap pipeline stages 802-808 comprises one or more mousetrap logic gates, as shown in FIG. 1, connected in series and/or in parallel. As further shown in FIG. 8, N pipeline latches 812-818 are associated in correspondence with the N mousetrap pipeline stages 802-808.

Furthermore, in the preferred embodiments, an alternating two clock system is implemented as previously discussed in regard to FIG. 7 in order to hide the precharge of the mousetrap logic gates in the mousetrap pipeline stages 802-808. The rising edge of a clock pulse from a clock CK actuates the input vectors to a pipeline stage, which comprises one or more already-armed mousetrap gates, and the falling edge of the same clock CK precharges the arming mechanisms of the same one or more mousetrap gates for the next vector inputs.

2. Operation

The operation of the pipeline 800 proceeds as follows. During the high time of clock CK1, a valid vector input is driven to the pipeline stage 802 by the pipeline latch 812 (latch 1). Moreover, pipeline stage 802 (stage 1) produces a valid vector output. The foregoing actions occur at all odd numbered stages during the high time of the clock CK1.

Furthermore, during the high time of clock CK1, the clock CK2 is low. Consequently, the vector input to pipeline stage 804 (stage 2) is driven invalid by the pipeline latch 814 (latch 2), which is driven, or enabled, by the high time of clock CK2. Moreover, the pipeline stage 804 (stage 2) produces an invalid vector output because the pipeline stage 804 (stage 2) is forced to armed predicament by the clock CK2 at low time. See FIG. 2 where NCK (active low) operates arming mechanisms 208 and 218. The foregoing actions occur at all even numbered stages during the high time of clock CK1, i.e., during the low time of clock CK2.

Next, the clocks CK1 and CK2 flip-flop, or reverse states. The clock CK2 transcends high, while the clock CK1 transcends low. The leading edge of the clock CK2 actuates the pipeline latch 814 (latch 2). Accordingly, the vector input to pipeline stage 804 (stage 2) is driven valid by the pipeline latch 804 (latch 2). Moreover, the pipeline stage 804 (stage 2) produces a valid vector output. The foregoing actions occur at all even numbered pipeline stages during the high time of clock CK2.

Furthermore, during the high time of the clock CK2, the clock CK1 is low. As a result, the vector input to pipeline stage 802 (stage 1) is driven invalid by pipeline latch 812 (latch 1), which is driven by the clock CK1 at high time. The pipeline stage 802 (stage 1) produces an invalid vector output because the pipeline stage 802 (stage 1) is forced in an armed predicament by the low clock CK1. The foregoing actions occur at all even numbered stages during the high time of clock CK2.

As a result of the above described operation parameters, one operation cycle starts and another finishes during each clock state ($CK_{machine}=CK1+CK2$) of the computer system. The precharge latency for the even numbered stages coincides with the logic propagation delay in the odd numbered stages, and vice versa. Thus, the overall delay incurred for precharging is hidden and is diminimus.

Another significant aspect of the present invention illustrated in FIG. 8 is that it provides for insensitivity to clock asymmetry. The pipeline stages (odd or even numbered) which operate in the disadvantaged phase effectively "steal" time from pipeline stages (even or odd numbered, respectively) which operate in the advantaged phase. The ability to steal time is available in part as a result of the inherent characteristics of mousetrap logic gates and in part as a result of the unique design and methodology of the pipeline latches 812-818.

Specifically, during the low time of a clock when precharging takes place at a particular pipeline stage, the vector outputs of the particular pipeline stage are forced to the invalid state. Moreover, during the high time of the clock, the vector inputs of the particular pipeline stage are forced to the valid state by enablement of the corresponding pipeline latch. Optimally, the vector inputs transition to a valid state and travel through the corresponding latch before the clock falls. Then, the vector inputs are processed by the pipeline stage and are gated to the stage's output when the clock falls.

However, if the clock falls before the transition of vector inputs to the valid state and subsequent transmission of the valid vector inputs to the stage, then the pipeline latch at the input of the pipeline stage behaves as an edge-triggered latch for the duration of the clock low time. In other words, a late arriving valid input state will be transferred immediately to the pipeline stage and processed by the pipeline stage. The pipeline stage's vector output is derived and persists at the output until the next transition to clock high time.

As a specific example to illustrate how time is stolen from the advantaged phase, consider the hypothetical proposition that pipeline stage 804 (stage 2) is initially active (propagation) and operates in the disadvantaged phase. The pipeline stage 804 (stage 2) can produce its result after the disadvantaged phase has already passed, or lapsed, due to the precharged predicament of its mousetrap logic gates. Specifically, the precharging of mousetrap logic gates is slow compared to the forward logic delay. Thus, the one or more mousetrap logic gates in the pipeline stage 804 can produce a valid vector output even after the precharge cycle is relinquished.

Further, because all of the vector inputs to pipeline latch 816 (latch 3) are self-timed, the pipeline latch 816 (latch 3) is designed in accordance with the present invention to capture the vector output of stage 804 (stage 2) well after the disadvantaged phase of stage 804 (stage 2), i.e., during the advantaged stage of stage 806 (stage 3). The vector output will be driven into the pipeline stage 806 (stage 3) slightly late in time, but proper functioning will occur because the pipeline stage 806 (stage 3) has time to waste being that it is operating in the advantage phase. Hence, pipeline stage 806 (stage 3) has in effect stolen time to pay the deficit in pipeline stage 804 (stage 2). Moreover, the pipeline 800 will operate as if the two clocks CK1 and CK2 had a perfect 50 percent duty cycle ($t_1=t_2$), as shown graphically in the upper portion of FIG. 7.

C. Latch State Machine of the Present Invention

Figure 9A:
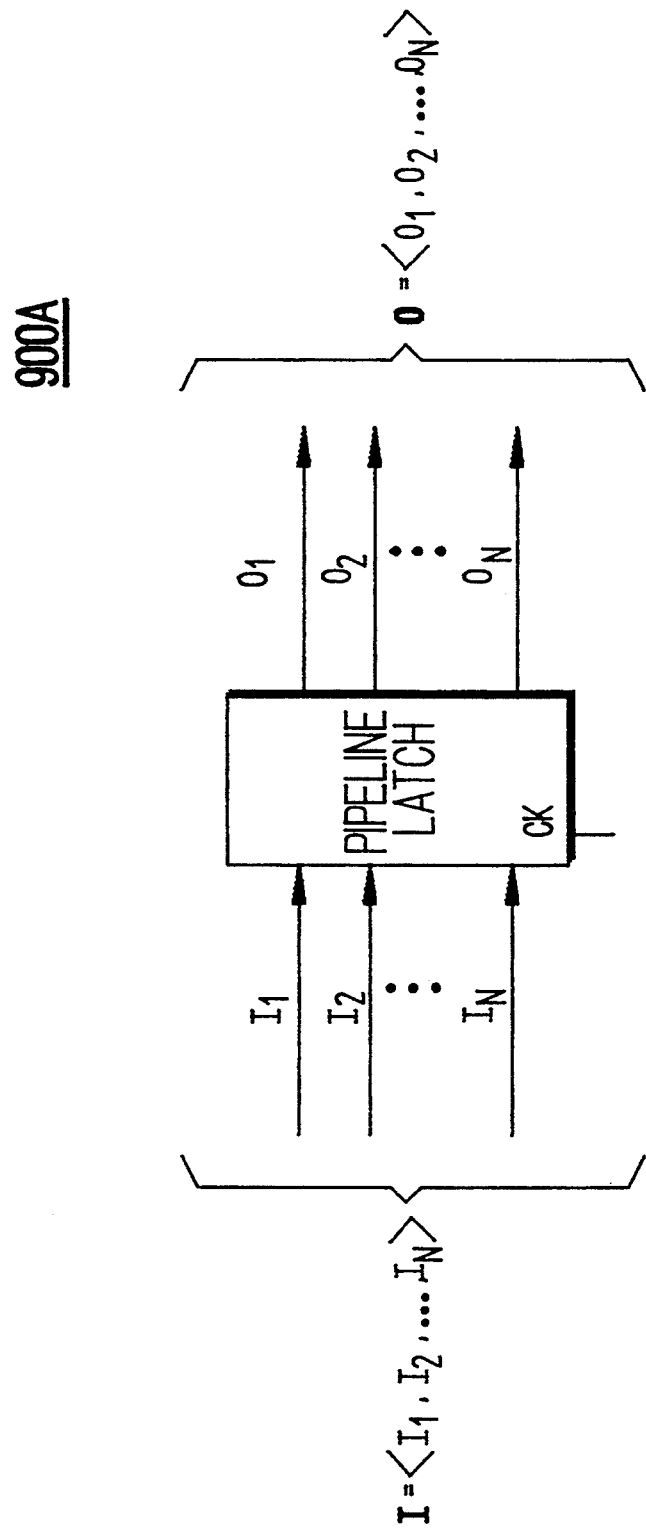
FIG. 9A and 9B illustrate at a high level the envisioned operation and response of the various pipeline latches of FIG. 8, in accordance with the present invention.
Figure 9B:
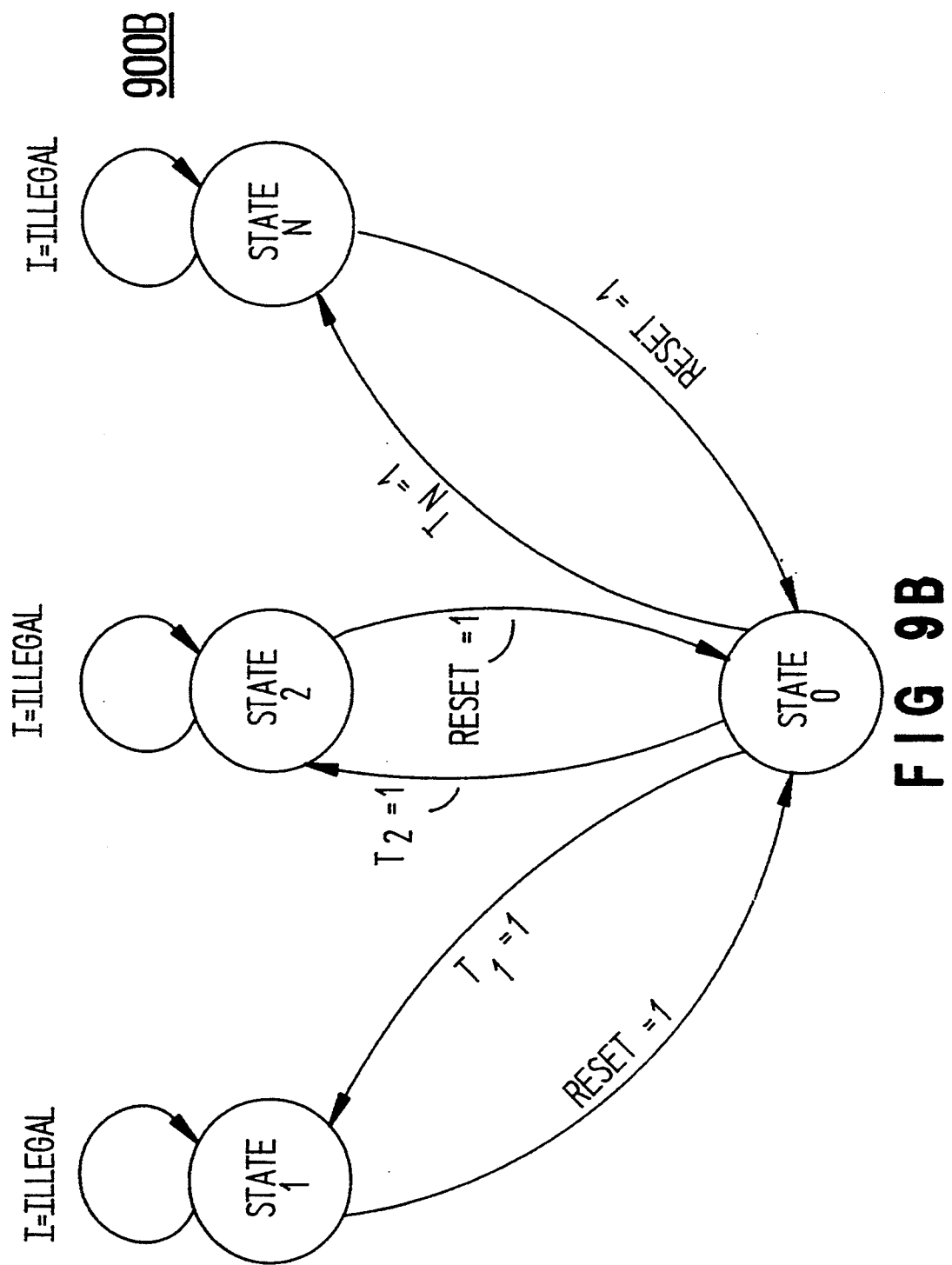

The present invention envisions implementing the pipeline latches 812-818 as state machines operating in accord with a state diagram 900B of FIG. 9B. For proper understanding of the state diagram 900B, FIG. 9A shows a high level block diagram of a pipeline latch 900A having a vector input $I = <I_1, I_2, \ldots, I_N>$ and a vector output $O = <O_1, O_2, \ldots, O_N>$, which corresponds to the pipeline latch 900A of FIG. 9A.

By designing the pipeline latch 900A to operate consistent with the state diagram 900B, logic operations can be performed by the novel pipeline 800 without a requisite minimum clock frequency.

Mousetrap logic gates which are pipelined in the conventional fashion, such as in FIG. 6, must maintain a minimum clock frequency in order to insure proper functioning. Proper operation of individual mousetrap gates requires that an electrical charge be deposited and maintained on the associated buffer mechanisms (reference numerals 112, 122, and 132 of FIG. 1) to maintain a proper logic states.

In reality, the electrical charge deposited on the buffer mechanisms eventually will discharge due to an unknown logic level and thereby corrupt the state of the pipeline. The decay results from uncontrollable design characteristics. Accordingly, vector outputs of mousetrap logic gates decay to an invalid logic state, defined as the case when more than one vector component is high. In most practical situations, the preceding problem may be overcome via a periodic refresh cycle, similar to the refresh cycle in conventional DRAM. Hence, a minimum clock rate, analogous to refresh cycles, must be maintained.

The minimum clock rate poses an additional problem. Many times, logic gates are required to operate arbitrarily slow, for instance, during IC testing. Conventionally, dynamic logic gates can be modified to exhibit slow operation by including "trickle charge" devices or "cross-coupled negative feedback" devices. However, these devices consume valuable computer real estate and further decrease the speed of the logic gates.

In order to eliminate the need for the pipeline 800 to operate at a minimum clock rate, the present invention envisions implementing the pipeline latches 812-818 as state machines operating in accord with the state diagram 900B of FIG. 9B.

In the state diagram 900B of FIG. 9B, "RESET" is defined, for purposes of discussion, as follows: RESET=CK*INVALID $I=CK*<I_1, I_2, \ldots, I_N=0>$. Furthermore, the states of the state machine 900B are defined as indicated in the state table, Table E, set forth below.

TABLE E

| States of State Machine | Status of Vector Output | Status of Vector Components |
|---|---|---|
| 0 | invalid | all = 0 |
| 1 | valid | $O_1$ = 1, all others = 0 |
| 2 | valid | $O_2$ = 1, all others = 0 |
| . | . | . |
| . | . | . |
| . | . | . |
| N | valid | $O_N$ = 1, all others = 0 |

D. First Preferred Embodiment

Figure 10:
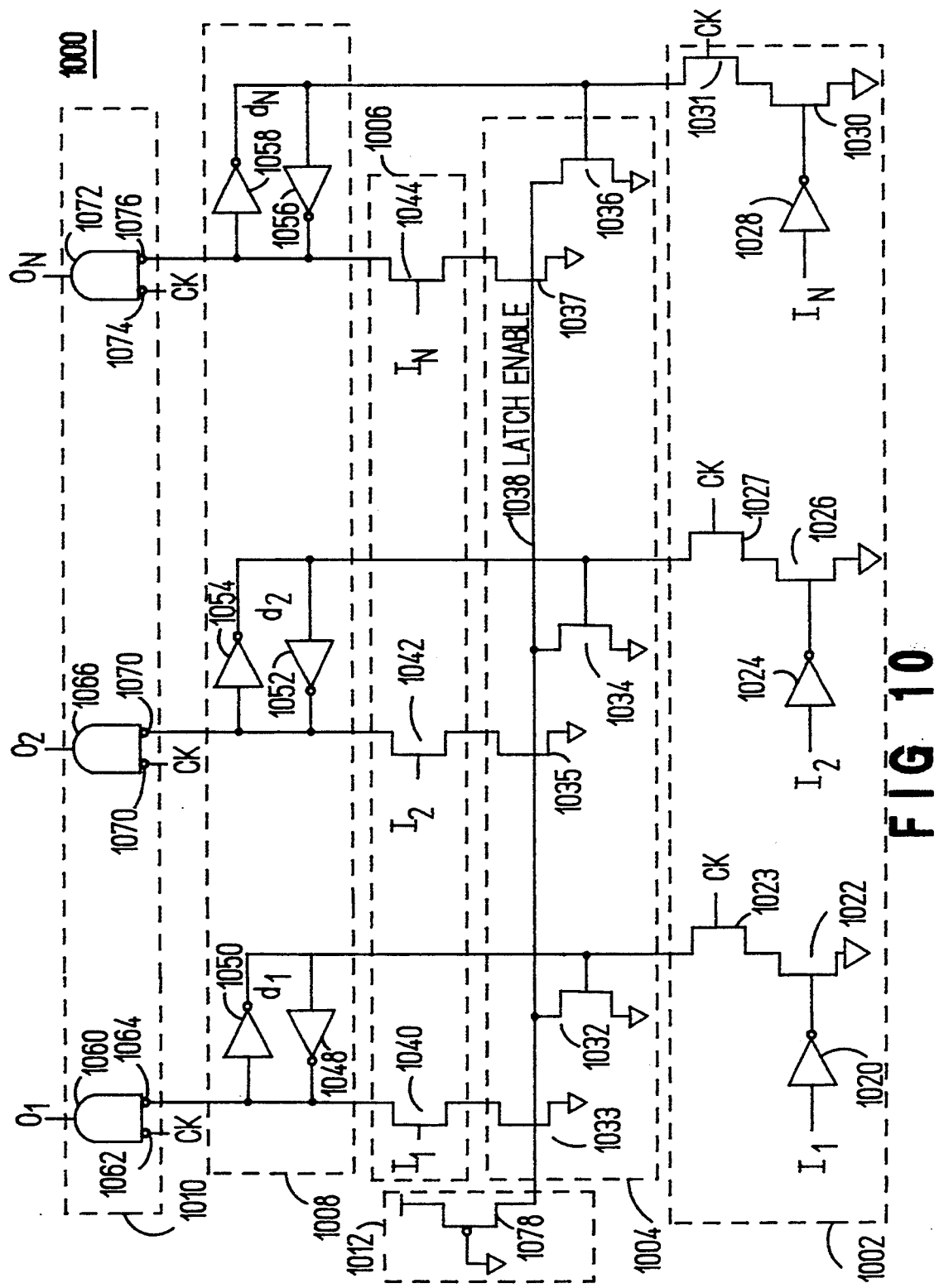
FIG. 10 illustrates a low level block diagram of a first preferred embodiment of the mousetrap pipeline latch in FIG. 8.

FIG. 10 illustrates a low level block diagram of an exemplary mousetrap pipeline latch 1000, corresponding with any one of the mousetrap pipeline latches 812-818 in FIG. 8. The latch 1000 is in accordance with a first preferred embodiment of the present invention. For discussion purposes, only a single vector input I and a single vector output O are shown and described, but the discussion is equally applicable to any number of vector inputs and outputs.

1. Architecture

As shown in FIG. 10, the latch 1000 of the first preferred embodiment comprises a latch reset mechanism 1002, an input trigger disabling mechanism 1004, an input trigger mechanism 1006, a flip-flop mechanism 1008, an output gating mechanism 1010, and a latch enable pull-up mechanism 1012.

More specifically, as shown in FIG. 10, the latch reset mechanism 1002 comprises a combination of a CMOSFET invertor and a MOSFET for each of the vector components $I_1$–$I_N$ of a vector input I. A CMOSFET invertor 1020 and an n-channel MOSFET 1022 correspond with an input vector component $I_1$. A CMOSFET invertor 1024 and an n-channel MOSFET 1026 correspond with an input vector component $I_2$. Finally, a CMOSFET invertor 1028 and an n-channel MOSFET 1030 correspond with an input vector component $I_N$. The inverse of each of the foregoing input vector components $I_1$–$I_N$ is derived by the corresponding invertor and the result is used to switch the respective MOSFET.

The input trigger disabling mechanism 1004 comprises n-channel MOSFETs 1032-1037. A dual set of MOSFETs is allocated to each of the N input vector components $I_1$–$I_N$. The MOSFETs 1032-1037 serve to pull a latch enable 1038 low as needed in accordance with the operation of the present invention which is discussed in specific detail later.

The input trigger mechanism 1006 has n-channel MOSFETs 1040-1044, one MOSFET for each of the N input vector components $I_1$–$I_N$. The MOSFETs are 1040-1044 are actuated by the N input vector components and serve to trigger the pipeline latch 1000.

The flip-flop mechanism 1008 comprises dual sets of conventional invertors, configured as shown. The pair of invertors 1048 and 1050 correspond with the input vector component $I_1$. The pair of invertors 1052 and 1054 correspond with the input vector component $I_2$. Finally, the pair of invertors 1056 and 1058 correspond with the input vector component $I_N$.

The output gating mechanism 1010 comprises N AND gates corresponding to the N vector components of a vector output O. As shown, the AND gates have inverted inputs. An AND gate 1060 with invertors 1062 and 1064 is associated with the output vector component $O_1$. An AND gate 1066 with invertors 1068 and 1070 is associated with the output vector component $O_2$. Finally, an AND gate 1072 with invertors 1074 and 1076 is associated with the output vector component $O_N$.

The latch enable pull-up mechanism 1012 comprises a p-channel MOSFET 1078 which pulls the latch enable 1038 to a logic high when necessary in accordance with the present invention. The specific operation of the pipeline latch 1000 is described below. The operation is in accordance with Table E, set forth previously.

2. Operation

The following sequence of events, or cycle, is applicable to the pipeline latch 1000 when the vector input I turns valid from invalid during the high time of clock CK. More generally, the following sequence of events will occur in the latch 1000 when the latch 1000 drives the input to a pipeline stage operating in the disadvantaged phase or when the pipeline 800 is operating very slow (at DC). In other words, the vector inputs to the latch 1000 are produced by a preceding pipeline stage operating in the advantaged phase.

Clock High Time (a) The latch enable 1038 is initially low. Moreover, by the design of the circuitry, note that $d_1+d_2+ \ldots +d_n = $ not(latch enable) $= 1$.

(b) The vector output O is forced invalid (all vector components low; $O_1-O_N=0$) by the output gating mechanism 1010 via the AND gates 1060, 1066, and 1072 with the high clock signal (either CK1 or CK2, depending upon the position of the latch in the pipeline).

(c) The vector input I is invalid (all vector components low; $I_1-I_N=0$), as a result of the invalid vector output from the previous pipeline stage caused by precharging.

(d) The flip-flop mechanism 1008 is set, via the latch reset mechanism 1002, such that $d_1-d_N=0$, because of the invalid input vector components $I_1-I_N=0$. Consequently, all pull-down MOSFETs 1032, 1034, and 1036 on the latch enable 1038 of the input trigger mechanism disabling mechanism 1004 are turned off. As a result, the latch enable 1038 gets pulled high by the latch enable pull-up mechanism 1012. Worth noting is that latch enable $=$ not$(d_1+d_2+ \ldots +d_n)=1$.

(e) The latch 1000 will remain in this steady state, until the vector input I transitions valid (one of vector components $I_1-I$ goes high). The high vector component actuates a MOSFET (1040, 1042, or 1044) of the input trigger mechanism 1006. As a result, a low signal appears at the input of the respective flip-flop, despite the fact that the latched flip-flop value (one of $d_1-d_N$) is attempting to impose a high signal at the input. In other words, the series connection of MOSFETs (1033, 1040; 1035, 1042; 1037, 1044) which is pulling low, wins over the flip-flop pulling high.

(f) As a result of step (e), the respective one of $d_1-d_N$ is turned high. Hence, the high vector component is recognized and is "latched" (preserved) at the respective flip-flop as one and only one of $d_1-d_N$. Moreover, the latch enable 1038 is pulled low through the corresponding pull-down MOSFET (1032, 1034, or 1038), thereby disabling the input trigger mechanism 1006.

(g) At this point, the clock can be stopped without losing the state of the vector input I. The vector input I has been recognized as valid and is preserved. Moreover, input trigger mechanism 1006 is disabled (latch enable $=0$). Importantly, if an illegal state on the input vector I occurs, i.e., if another vector component goes high, as a result of node decay or some other reason, the pipeline latch 1000 will ignore the illegal state.

(h) Finally, the clock CK transitions low.

Clock Low Time (i) The vector output O is gated valid. In other words, the flip-flop with the latched, high vector component will transmit the high signal to the respective AND gate. All other AND gates will not emit an output signal.

(j) The vector input I turns to the invalid state as a result of the forced invalid output setting of the previous stage due to precharging. The latch reset mechanism 1002 remains disabled and latch enable 1038 is low.

(k) The clock transitions high and the foregoing cycle is repeated.

The following sequence of events is applicable to the pipeline latch 1000 when the vector input turns valid from invalid after a clock high time. More generally, the following sequence of events will occur in the latch 1000 when the latch 1000 drives the input to a mousetrap pipeline stage operating in the advantaged phase, i.e., when the latch 1000 is receiving inputs from a pipeline stage operating in the disadvantaged phase.

Clock High Time (a) The latch enable 1038 is initially low. Moreover, by the design of the circuitry, note that $d_1+d_2+ \ldots +d_n = $ not(latch enable) $= 1$.

(b) The vector output O is forced invalid (all vector components low; $O_1\text{'}O_N=0$) by the output gating mechanism 1010 via the AND gates 1060, 1066, and 1072 with the high clock signal (either CK1 or CK2, depending upon the position of the latch in the pipeline).

(c) The vector input I is invalid (all vector components low; $I_1-I_N=0$), as a result of the invalid vector output from the previous pipeline stage caused by precharging.

(d) The flip-flop mechanism 1008 is reset, via the latch reset mechanism 1002, such that $d_1-d_N=0$, because of the invalid input vector components $I_1-I_N$. Consequently, all pull-down MOSFETs 1032, 1034, and 1036 on the latch enable 1038 of the input trigger mechanism disabling mechanism 1004 are turned off. As a result, the latch enable 1038 gets pulled high by the latch enable pull-up mechanism 1012. Worth noting is that latch enable $=$ not$(d_1+d_2+ \ldots +d_n)=1$.

(e) The clock transitions low.

Clock Low Time (f) The vector output O is gated out of the latch 1000. Because no valid input has yet been received, d1-dN$=0$ and the vector output O remains invalid (all vector components are low).

(g) The vector input I transitions valid (one of the vector component goes high). The high vector component actuates the corresponding MOSFET of the input trigger mechanism 1006. Consequently, the high vector component is recognized and passes through the corresponding MOSFET and directly through the corresponding AND gate. Said another way, the vector output O transitions to a valid state. In a sense, the latch 1000 operates after its allotted clock time as a "transparent" latch. It steals time from the subsequent stage in the pipeline.

(h) In turn, the flip-flop mechanism 1008 pulls the latch enable 1038 low through the corresponding pull-down MOSFET (1032, 1034, or 1036), thereby disabling the input trigger mechanism 1006.

(i) The vector input turns to the invalid state as a result of the forced invalid output setting of the previous stage due to precharging. The vector output remains valid (latched). Moreover, the latch reset mechanism 1002 remains disabled and latch enable 1038 remains low.

(j) The clock transitions high and the foregoing cycle is repeated.

E. Second Preferred Embodiment

Figure 11:
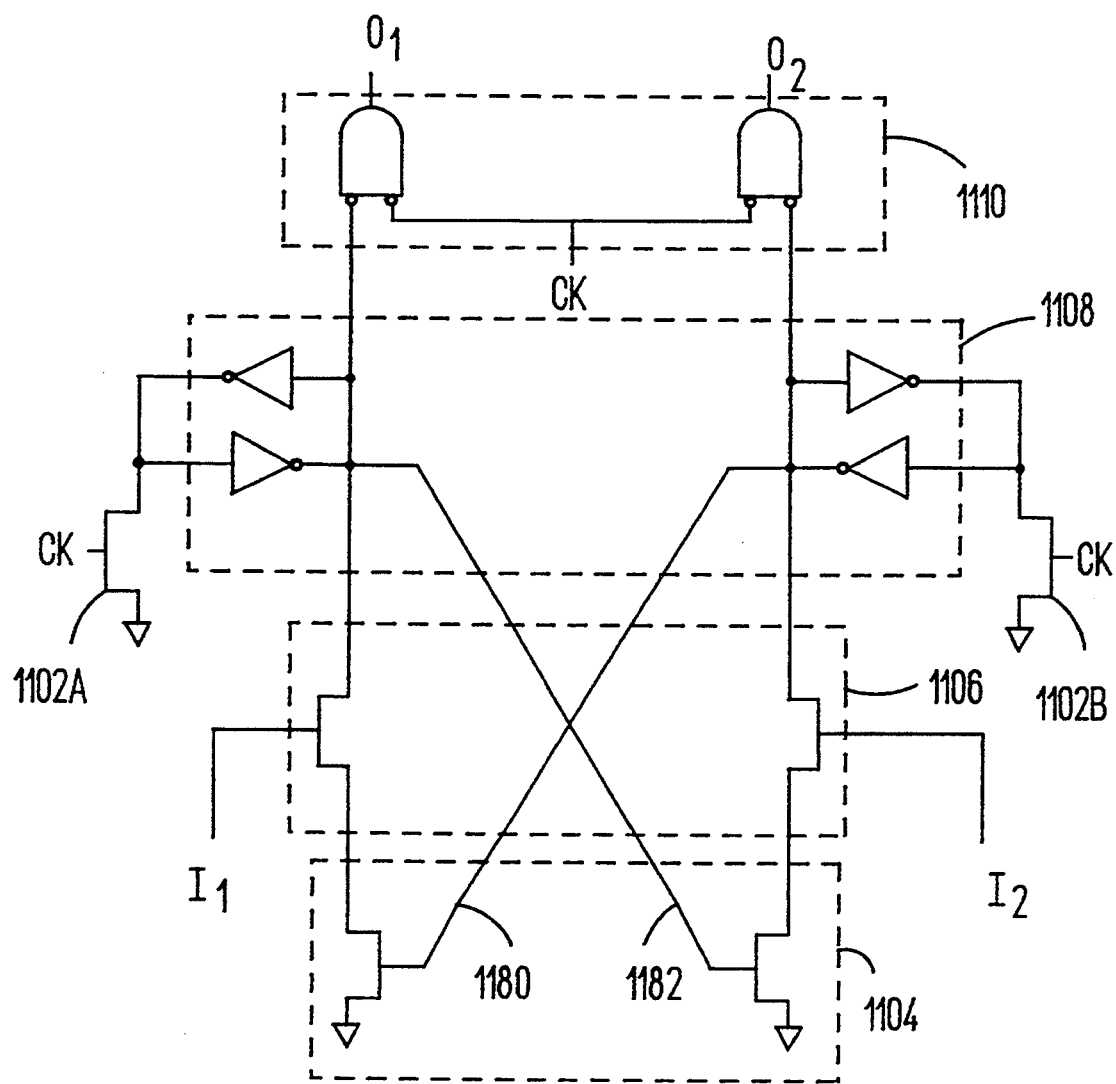
FIG. 11 illustrates a low level block diagram of the mousetrap latch in accordance with a second preferred embodiment wherein the pipeline of FIG. 8 processes a vector input and a vector output, each having only two vector components.

FIG. 11 illustrates a low level block diagram of a useful mousetrap pipeline latch 1100 in accordance with the present invention when the pipeline latch 1000 of FIG. 10 has a vector input I and a vector output O having only two vector components (N=2).

As shown, the latch 1100 comprises a latch reset mechanisms 1102A and 1102B, an input trigger disabling mechanism 1104, an input trigger mechanism 1106, a flip-flop mechanism 1108, and an output gating mechanism 1110.

Several aspects of the latch 1100 are worth noting. A cross-over network, denoted by reference numerals 1180 and 1182, has been implemented. As a consequence, no latch enable pull-up mechanism 1012 as in FIG. 10 is needed. Moreover, the invertors 1020, 1024, and 1028 shown in the latch reset mechanism 1002 of FIG. 10 are not required and have been eliminated, thereby further reducing the size and complexity of the circuit.

In operation, at a high conceptual level, the latch 1100 functions in accordance with the methodology set forth in regard to latch 1000 of FIG. 10 to perform the same purpose.

The foregoing description of the preferred embodiments of the present invention has been presented for purposes of illustration and description. It is not intended to be exhaustive or to limit the present invention to the precise forms disclosed, and obviously many modifications and variations are possible in light of the above teachings. The particular embodiments were merely chosen and described in order to best explain the principles of the present invention and its practical application to those persons skilled in the art and to thereby enable those persons skilled in the art to best utilize the present invention in various embodiments and with various modifications as are suited to the particular use contemplated. It is intended that the scope of the present invention be broadly defined by the claims.

I claim the following:

1. A system for a pipeline of self-timed dynamic logic, the system for hiding the precharging operation from a forward logic flow, while enabling recovery from clock asymmetry and eliminating the need for a minimum clock frequency, the system comprising:

(1) first and second logic blocks having self-timed dynamic logic, each of said logic blocks for precharging and evaluating self-timed data alternately;

(2) first and second clocks for generating first and second clock signals respectively for said first and second logic blocks respectively, said first and second clock signals each having approximately a fifty percent duty cycle and alternating so that said first logic block is accorded a precharge period when said second logic block is accorded an evaluation period and so that said first logic block is accorded said evaluation period when said second logic block is accorded said precharge period;

(3) a latch means for receiving said self-timed data from said first logic block and for transferring said data to said second logic block, said latch means for receiving said second clock signal, said second clock signal having first and second edges, said first edge for commencing said evaluation period in said second logic block, said second edge for commencing said precharge period in said second logic block, said latch means capable of receiving and storing said self-timed data from a time period prior to said first edge until receiving said self-timed data, said latch means for transferring said self-timed data to said second logic block after said first edge, said latch means comprising:

(a) a storage means for storing said data from said first logic block;

(b) reset means for enabling receipt of said data by said storage means prior to said first edge of said second clock signal;

(c) disabling means for disabling receipt of said data by said storage means after receiving said data from said first logic block; and (d) output gating means for transferring said data to said second logic block from said storage means after said first edge.

2. The system of claim 1, wherein said data is a vector defined by a plurality of data paths, said vector being invalid in time when said data paths exhibit a logic low, said vector being valid in time when a subset of said data path exhibit a logic high.

3. The system of claim 1, wherein said first and second logic blocks each comprise mousetrap logic.

4. The system of claim 1, wherein said storage means comprises a flip-flop mechanism.

5. The system of claim 1, wherein said output gating means comprises a logic AND gate for combining said second clock signal with an output of said storage means.

6. The system of claim 2, wherein said subset is one in number.

7. The system of claim 2, wherein said subset is two in number.

8. The system of claim 2, wherein said plurality of logic paths is at least three in number.

9. A system for a pipeline of self-timed dynamic logic, the system for hiding the precharging operation from a forward logic flow, while enabling recovery from clock asymmetry and eliminating the need for a minimum clock frequency, the system comprising:

first and second logic blocks having self-timed dynamic logic, each of said logic blocks for precharging and evaluating self-timed data alternately;

first and second clocks for generating first and second clock signals respectively for said first and second logic blocks respectively, said first and second clock signals each having approximately a fifty percent duty cycle and alternating so that said first logic block is accorded a precharge period when said second logic block is accorded an evaluation period and so that said first logic block is accorded said evaluation period when said second logic block is accorded said precharge period;

said first logic block having first outputs and a means for driving said first outputs to an inactive logic state during said precharge period;

a latch means for monitoring said first outputs, for receiving self-timed data on said first outputs, and for transferring said data to said second logic block, said latch means for receiving said second clock signal, said second clock signal having first and second edges, said first edge for commencing said evaluation period in said second logic block, said second edge for commencing said precharge period in said second logic block, said latch means capable of receiving and storing said self-timed data from a first time prior to said first edge until a second time, said first time being when said latch means detects said inactive logic state on said first outputs, said second time being when said latch means detects an active logic state on said first outputs, said latch means for transferring said self-timed data to said second logic block after said first edge.

10. A system for a pipeline of dynamic logic implementing a self-timed monotonic progression of vector logic, the system for hiding the precharging operation from a forward logic flow, while enabling recovery from clock asymmetry and eliminating the need for a minimum clock frequency, the system comprising:

(a) first and second logic means having self-timed dynamic logic, said first logic means for outputting a self-timed vector, said vector being defined by a plurality of data paths, said vector being invalid when said data paths exhibit a logic low, said vector being valid when a subset of said data paths exhibit a logic high, said first logic means for driving said vector invalid during precharging and for driving said vector valid after evaluating inputs;

(b) first and second clocks for generating first and second clock signals respectively for said first and second logic means respectively, said first and second-clock signals each having approximately a fifty percent duty cycle and alternating so that said first logic means is accorded a precharge period when said second logic means is accorded an evaluation period and so that said first logic block is accorded said evaluation period when said second logic block is accorded said precharge period;

(c) a latch means for receiving said self-timed vector from said first logic means and for transferring said vector to said second logic means, said latch means for receiving said second clock signal, said second clock signal having first and second edges, said first edge for commencing said evaluation period in said second logic means, said second edge for commencing said precharge period in said second logic means, said latch means comprising:

(1) a storage means for storing said vector when valid;

(2) reset means for enabling receipt of said vector by said storage means after said vector is recognized as invalid prior to said first edge of said second clock;

(3) input trigger means for recognizing said vector as valid and for transferring said vector to said storage means when valid;

(4) input trigger disabling means for disabling receipt of said vector by said storage means after receiving said vector from said first logic means; and (5) output gating means for transferring said vector to said second logic means from said storage means after said first edge.

11. The system of claim 10, wherein said first and second logic blocks each comprise mousetrap logic.

12. The system of claim 10, wherein said storage means comprises a flip-flop mechanism.

13. The system of claim 10, wherein said output gating means comprises a logic AND gate for combining said second clock signal with an output of said storage means.

14. The system of claim 10, wherein said subset is one in number.

* * * * *